(12) United States Patent
Miyachi et al.

(10) Patent No.: US 8,803,383 B2
(45) Date of Patent: Aug. 12, 2014

(54) ELECTRIC DRIVE APPARATUS

(75) Inventors: Syuhei Miyachi, Okazaki (JP); Masashi Yamasaki, Obu (JP); Tatsuya Abe, Chiryu (JP)

(73) Assignee: Denso Corporation, Kariya (JP)

( * ) Notice: Subject to any disclaimer, the term of this patent is extended or adjusted under 35 U.S.C. 154(b) by 754 days.

(21) Appl. No.: 13/068,738

(22) Filed: May 19, 2011

(65) Prior Publication Data

US 2011/0285223 A1 Nov. 24, 2011

(30) Foreign Application Priority Data

May 21, 2010 (JP) ................................ 2010-117687
Dec. 28, 2010 (JP) ................................ 2010-292294

(51) Int. Cl.
*H02K 11/00* (2006.01)

(52) U.S. Cl.
CPC .................................. *H02K 11/0073* (2013.01)
USPC ............. 310/68 D; 310/64; 310/68 R; 310/72

(58) Field of Classification Search
USPC ....... 310/64, 68 R, 68 D, 68 B, 72; 318/400.1
See application file for complete search history.

(56) References Cited

U.S. PATENT DOCUMENTS

| | | | |
|---|---|---|---|
| 5,132,896 A | 7/1992 | Nishizawa et al. | |
| 6,081,056 A * | 6/2000 | Takagi et al. | 310/89 |
| 6,181,590 B1 | 1/2001 | Yamane et al. | |
| 6,525,950 B1 | 2/2003 | Shirakawa et al. | |
| 6,704,201 B2 * | 3/2004 | Kasuga | 361/704 |
| 2001/0036409 A1 | 11/2001 | Murata et al. | |
| 2009/0295317 A1 * | 12/2009 | Townsend et al. | 318/400.4 |
| 2010/0052449 A1 | 3/2010 | Hashimoto et al. | |
| 2012/0104886 A1 | 5/2012 | Yamasaki et al. | |

FOREIGN PATENT DOCUMENTS

| | | |
|---|---|---|
| CN | 102460912 A | 5/2012 |
| JP | B2-2586685 | 3/1997 |
| JP | A-10-229681 | 8/1998 |
| JP | 2002-031084 | 1/2002 |
| JP | B2-3293335 | 4/2002 |
| JP | B2-3501685 | 3/2004 |
| JP | B2-3532386 | 3/2004 |
| JP | A-2004-215335 | 7/2004 |
| JP | B2-3633432 | 3/2005 |
| JP | B2-3729176 | 10/2005 |
| JP | 2008-61282 | 3/2008 |
| JP | A-2009-089542 | 4/2009 |
| JP | 2010-063242 | 3/2010 |

OTHER PUBLICATIONS

Office action dated Mar. 11, 2013 in corresponding Chinese Application No. 2011 10135705.0.
Office action dated Apr. 26, 2012 in corresponding JP Application No. 2010-292294.

* cited by examiner

*Primary Examiner* — Burton Mullins
(74) *Attorney, Agent, or Firm* — Harness, Dickey & Pierce, P.L.C.

(57) ABSTRACT

Two power modules, in which switching elements for switching over currents supplied to coils of a motor are resin-molded, are provided to face each other sandwiching a plane including a rotation axis of a shaft. A first smoothing capacitor, second smoothing capacitors and a choke coil are located between the power modules. By consolidating large-sized electronic parts between the power modules, a control unit can be reduced in size and impedance of electric conductor connecting the electronic parts and the power modules can be reduced.

16 Claims, 30 Drawing Sheets

ELECTRIC DRIVE APPARATUS

CROSS REFERENCE TO RELATED APPLICATION

This application is based on and incorporates herein by reference Japanese patent applications No. 2010-117687 filed on May 21, 2010 and No. 2010-292294 filed on Dec. 28, 2010.

FIELD OF THE INVENTION

The present invention relates to a motor and an electric drive apparatus, which has an electronic control unit for controlling drive of the motor.

BACKGROUND OF THE INVENTION

In some conventional electric drive apparatuses, which are used for an electric power steering system for assisting steering operation of a driver, an electronic control unit is combined with a motor. The control unit for the electric drive apparatus is required to be compact in size, low in noise and effective to increase output torque of the motor.

According to the following patent documents 1 and 2, three capacitors, which smooth variation in voltage of an input power source, are arranged in as row. In addition, six power modules are located in parallel in two rows. The row of three capacitors and the rows of six power modules are arranged in an L-shape. Current supplied from the power source flows from first bus bars to the power modules through the capacitors and second bus bars.
(Patent document 1) JP 3729176
(Patent document 2) JP 2004-215335A However, the control unit needs be sized large if the capacitors and the power modules are arranged in L-shape. The first bus bars, which connect the capacitors and the power modules, increase impedance of electric conductor and lower performance of the capacitors. If the impedance of electric conductor increases, the current supplied from the power source to the motor through the control unit decreases and the output torque of the motor decreases.

SUMMARY OF THE INVENTION

It is therefore an object of the present invention to provide an electric drive apparatus, which is compact in size.

According to one aspect of the present invention, an electric drive apparatus comprises a motor, a plurality of power modules, a first smoothing capacitor, a choke coil and second smoothing capacitors. The motor has a motor case formed in a cylindrical shape, a stator located radially inside the motor case and coils wound to provide a plurality of phases, a rotor located radially inside the stator and rotatable relative to the stator, and a shaft rotatable together with the rotor. The power modules are located to sandwich a plane including a rotation axis of the shaft therebetween at one axial end side of the shaft. Each of the power modules includes switching elements for switching over a current supplied to the coils, a mold part molding the switching elements therein and terminals protruding from the mold part. The first smoothing capacitor is electrically connected to a power circuit connector side to supply current to the switching elements from a power source for reducing power source noise. The choke coil is electrically connected in series between the power source and the switching elements for attenuating variation in power supplied to the switching elements. The second smoothing capacitors are electrically connected to the switching elements in parallel for absorbing ripple current generated when current supply to the switching elements is switched over. At least one of the first smoothing capacitor, the second smoothing capacitors and the choke coil is located between the power modules.

BRIEF DESCRIPTION OF THE DRAWINGS

The foregoing and other objects, features and advantages of the present invention become more apparent from the following detailed description made with reference to the accompanying drawings. In the drawings.

DETAILED DESCRIPTION OF THE PREFERRED EMBODIMENT

Figure 1:
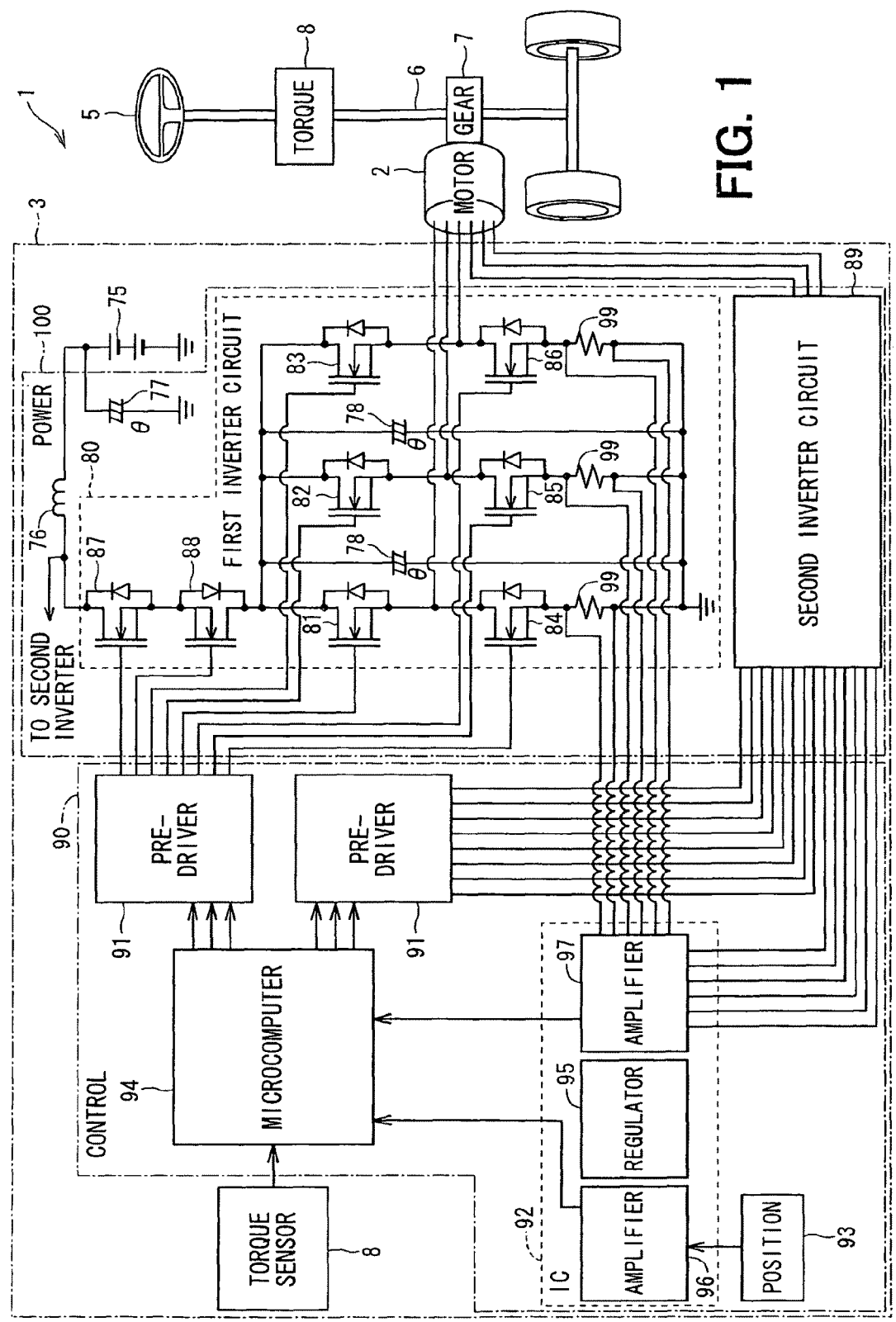
FIG. 1 is a block diagram of a power steering apparatus using an electric drive apparatus according to a first embodiment of the present invention.

A drive apparatus according to the present invention will be described below with reference to various embodiments shown in the drawings. In a plurality of embodiments described below, substantially the same configuration is indicated by the same numeral to omit the same description.

First Embodiment

A drive apparatus according to a first embodiment of the present invention is shown in FIG. 1 to FIG. 17 and referenced by numeral 1. The drive apparatus 1 is applied to an electric power steering system (referred to as EPS) of a vehicle.

Electric configuration of the EPS is described first with reference to FIG. 1. The electric configuration described hereunder is applicable to other embodiments. As shown in FIG. 1, the electric drive apparatus 1 is for assisting steering operation of a steering wheel 5 of a vehicle by driving a column shaft 6 to generate rotational torque through a gear 7 attached to the column shaft 6, which is a rotational shaft of the steering wheel 5. Specifically, when the steering wheel 5 is operated by a driver, the electric drive apparatus 1 assists the steering operation of the driver on the steering wheel 5 by detecting steering torque generated in the column shaft 6 and acquiring vehicle speed information from CAN (Controlled Area Network), which is not shown. The steering torque is detected by a torque sensor 8.

The motor 2 is a brushless motor, which rotates the gear 7 in forward and reverse directions. An electronic control unit 3 is provided to control current supply to the motor 2 and drive operation of the motor 2. The control unit 3 has a power circuit 100, which supplies drive currents of the motor 2, and a control circuit 90, which controls driving of the motor 2.

The power circuit 100 has a choke coil 76 provided between a power source 75 and a power supply line, a first smoothing capacitor 77, a first inverter circuit 80 and a second inverter circuit and 89. The first smoothing capacitor 77 and the choke coil 76 form a filter circuit thereby to reduce noises transmitted from other external devices, which are operated with the power source 75 in common. It also reduces noises transmitted from the electric drive apparatus 1 to other external devices, which use the power source 75 in common.

The inverter circuits 80 and 89 have the same configuration, and hence the first inverter circuit 80 is described below. The inverter circuit 80 has MOSFETs (metal-oxide-semiconductor field-effect transistor referred to as FET) 81 to 86, which are one type of field-effect transistors. The FETs 81 to 86 are turned on (conduction) or off (non-conduction) between source-drain paths depending on gate potentials. The FETs 81 to 86 are switching elements.

The FET 81 has a drain connected to the power supply line side and a source connected to a drain of the FET 84. The FET 84 has a source connected to the ground through a shunt resistor 99. A junction between the FET 81 and the FET 84 is connected to a U-phase coil of the motor 2. The FET 82 has a drain connected to the power supply line side and a source connected to a drain of the FET 85. The FET 85 has a source connected to the ground through a shunt resistor 99. A junction between the FET 82 and the FET 85 is connected to a V-phase coil of the motor 2. The FET 83 has a drain connected to the power supply line side and a source connected to a drain of the FET 86. The FET 86 has a source connected to the ground through a shunt resistor 99. A junction between the FET 83 and the FET 86 is connected to a W-phase coil of the motor 2.

The inverter circuit 80 has power supply relays 87 and 88. The power supply relays 87 and 88 are formed of MOSFETs similar to the FETs 81 to 86. The power supply relays 87 and 88 are provided between the FETs 81 to 83, which are high-side FETs, and the power source 75 to interrupt current from flowing to the motor 2 side through the FETs 81 to 86 at the time of occurrence of abnormality.

The shunt resistors 99 are electrically connected between the FETs 84 to 86, which are low-side FETs, and the ground. Currents flowing in the U-phase coil, the V-phase coil and the W-phase coil are detected by detecting voltages developed by or currents flowing in the shunt resistors 99.

A plurality of, for example two, second smoothing capacitors 78, which are electrolytic capacitors, are electrically connected between power source sides of the FETs 81 to 86 provided at the power supply line side (high potential side) and ground sides (low potential side) of the shunt resistors 99. The second smoothing capacitors 78 assist electric power supply to the FETs 81 to 86 and suppress noise components such as surge voltages by storing electric charge.

The control circuit 90 has a pre-driver 92, a customized IC 92, a position sensor 93 as a rotation detection part and a microcomputer 94. The customized IC 92 has, as functional blocks, a regulator circuit 95, a position signal amplifier circuit 96 and a detection voltage amplifier circuit 97.

The regulator circuit 95 is a stabilizing circuit for stabilizing power supply. The regulator circuit 95 stabilizes electric power supplied to each part. For example, the microcomputer 94 is operated with a predetermined voltage (for example, 5V), which is stabilized by the regulator circuit 95.

A signal from a position sensor 93 is applied to the position signal amplifier circuit 96. The position sensor 93 detects a rotational position of the motor 2 and the rotational position signal is applied to the position sensor signal amplifier circuit 96. The position sensor signal amplifier circuit 96 amplifies and outputs the rotation position signal. The detection voltage amplifier circuit 97 detects a voltage of the shunt resistor 99 and amplifies and outputs the terminal voltage of the shunt resistor 99.

The rotation position signal of the motor 2 and the terminal voltages of the shunt resistors 99 are inputted to the microcomputer 94. A steering torque signal is also inputted to the microcomputer 94 from the torque sensor 8 attached to the column shaft 6. The vehicle speed information is inputted to the microcomputer 94 through CAN.

The microcomputer 94 controls, when the steering torque signal and the vehicle speed information are inputted, the inverter circuit 80 through the pre-driver 91 in correspondence to the rotation position signal so that the steering operation by the steering wheel 5 is assisted in correspondence to the vehicle travel speed. Specifically, the microcomputer 94 controls the inverter circuit 80 by switching over on/off states of the FETs 81 to 86 through the pre-driver 91. Since the gates of the FETs 81 to 86 are connected to six output terminals of the pre-driver 91, the on/off states of the FETs 81 to 86 are switched over by changing the gate voltages by the pre-driver 91.

The microcomputer 94 controls the inverter circuit 80 in accordance with the terminal voltages of the shunt resistors 99, which are inputted from the detection voltage amplifier circuit 97, so that the current supplied to the motor 2 is approximated in a sinusoidal waveform. The microcomputer 94 also controls the inverter circuit 89 in the similar manner as controlling the inverter circuit 80.

The mechanical structure of the electric drive apparatus 1 is described next with reference to FIG. 2 to FIG. 6. The electric drive apparatus 1 has a stack structure, in which the control unit 3 is located at one axial end side of the motor 2. The motor 2 and the control unit 3 are thus coupled to each other in the axial direction of the motor 2, that is, in the up-down direction in FIG. 2.

The motor 2 has a motor case 10, a stator 20, a rotor 30, a shaft 35 and the like.

Figure 2:
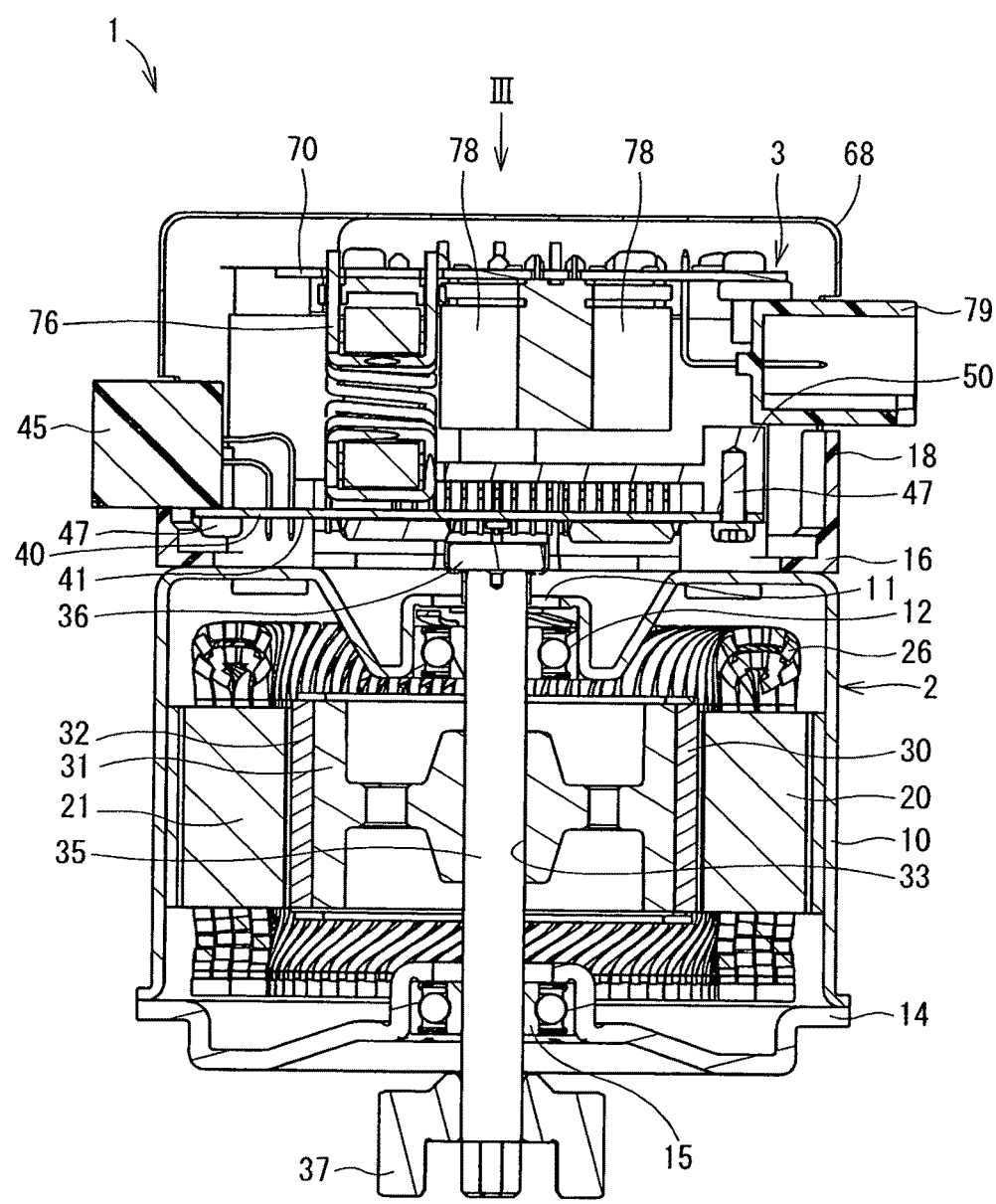
FIG. 2 is a sectional view of the electric drive apparatus according to the first embodiment.
Figure 3:
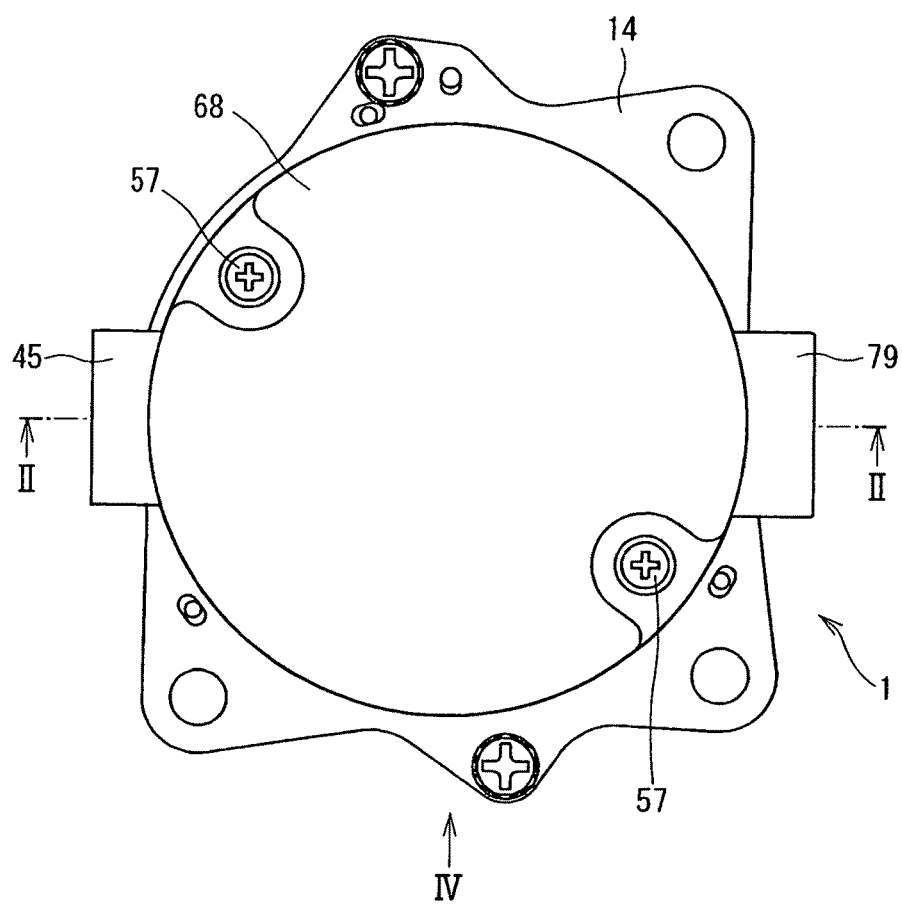
FIG. 3 is a plan view of the electric drive apparatus according to the first embodiment viewed in a direction III in FIG. 2.

As shown in FIG. 2 and FIG. 3, the motor case 10 is formed in a cylindrical shape and made of iron or the like. An end frame 14 made of aluminum is tightly fixed to the motor case 10 at an axial end part, which is opposite to the control unit 3, by screws or the like. An opening 11 is provided in the motor case 10 at the axial center of an end part, which is on the control unit 3 side. The shaft 35 passes through the opening. A resin guide 16 is provided at the end part of the motor case 10, which is at the control unit 3 side. The resin guide 16 is formed in substantially an annular shape having its central part, which is open.

The stator 20 is located inside the motor case 19 in a radial direction. The stator 20 is formed by winding wires on a stacked iron core, which is a stack of thin plates of magnetic material. The wires form three coils 26 of U-phase, V-phase and W-phase of the motor 2.

Figure 5:
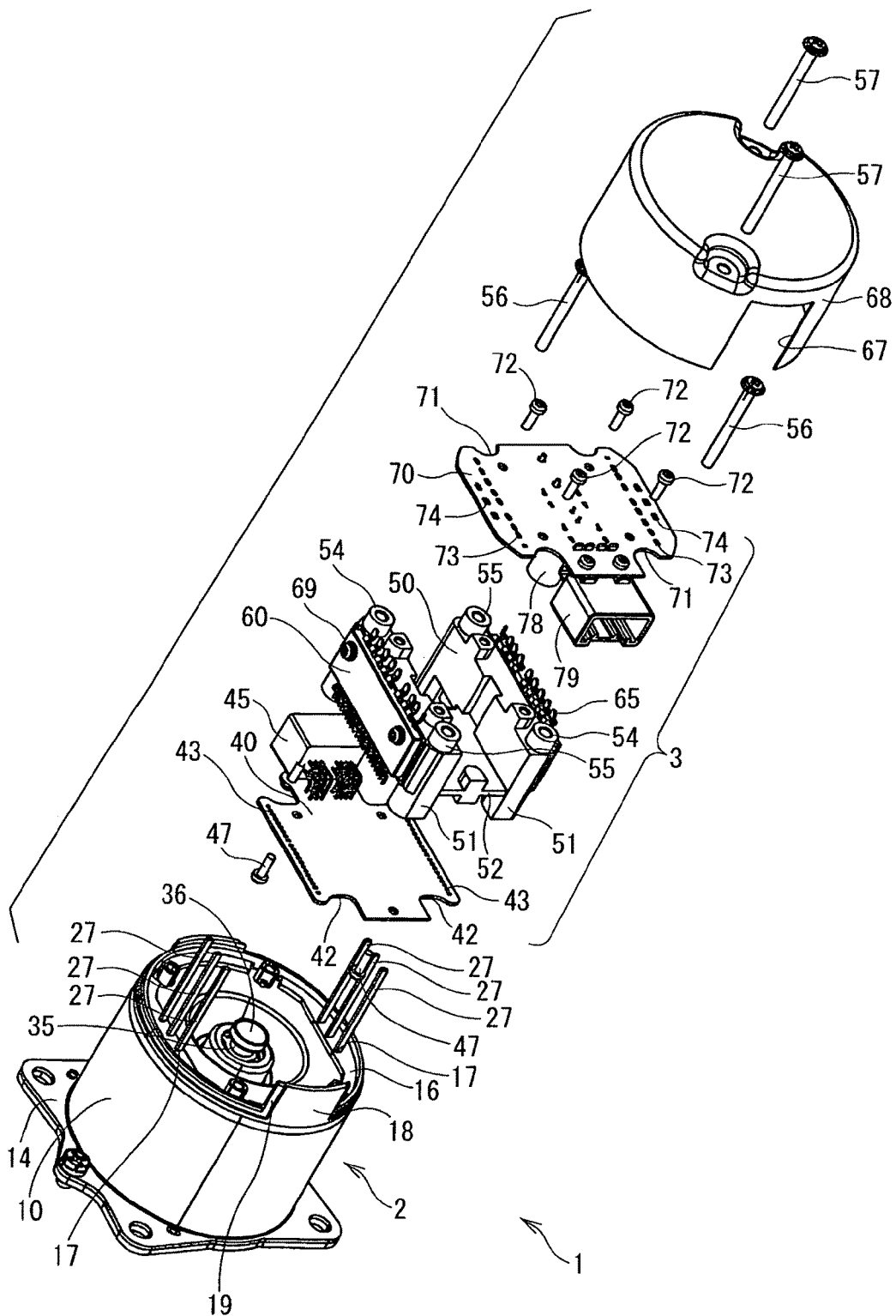
FIG. 5 is an exploded perspective view of the electric drive apparatus according to the first embodiment viewed from a top side of a motor.

As shown in FIG. 5, six holes 17 are formed in the resin guide 16. The coils 26 are taken out from six locations of six holes 17 to form motor leads 27. The motor leads 27 pass through six holes 17 formed in the resin guide 16. Thus, the motor leads 27 are positioned by the resin guide 16 and surely insulated from the motor case 10. The motor leads 27 are taken out towards the control unit 3 side and connected to a power circuit substrate 70 through a control circuit substrate 40 and a radially outside part of power modules 60, which correspond to the inverter circuits 80 and 89. That is, the motor leads 27 are located radially outside the power modules 60 when viewed in the axial direction of the motor 2. The power circuit substrate 70 is a printed-circuit board.

The rotor 30 is located radially inside the stator 20 as shown in FIG. 2 so that it is rotatable relative to the stator 20. The rotor 30 is formed of magnetic material such as iron in a cylindrical shape. The rotor 30 has a rotor core 31 and permanent magnets 32 located radially outside the rotor core 31. The permanent magnets 32 are arranged so that N-pole and S-pole alternate in a circumferential direction.

The shaft 35 is fixed in a shaft hole 33 formed in the center axis of the rotor core 31. The shaft 35 is supported rotatably by a bearing 12 provided in the motor case 10 and a bearing 15 provided in the end frame 14. Thus the shaft 35 is rotatable with the rotor 30 relative to the stator 20.

The shaft 35 has a magnet 36 at its axial end part, which is at the control unit 3 side. The magnet 36 fixed to the axial end part of the shaft 35 at the control unit 3 side is exposed towards the control unit 3 side. The magnet 36 is located to face an end surface 41 of the control circuit substrate 40, which is at the motor 2 side.

Figure 4:
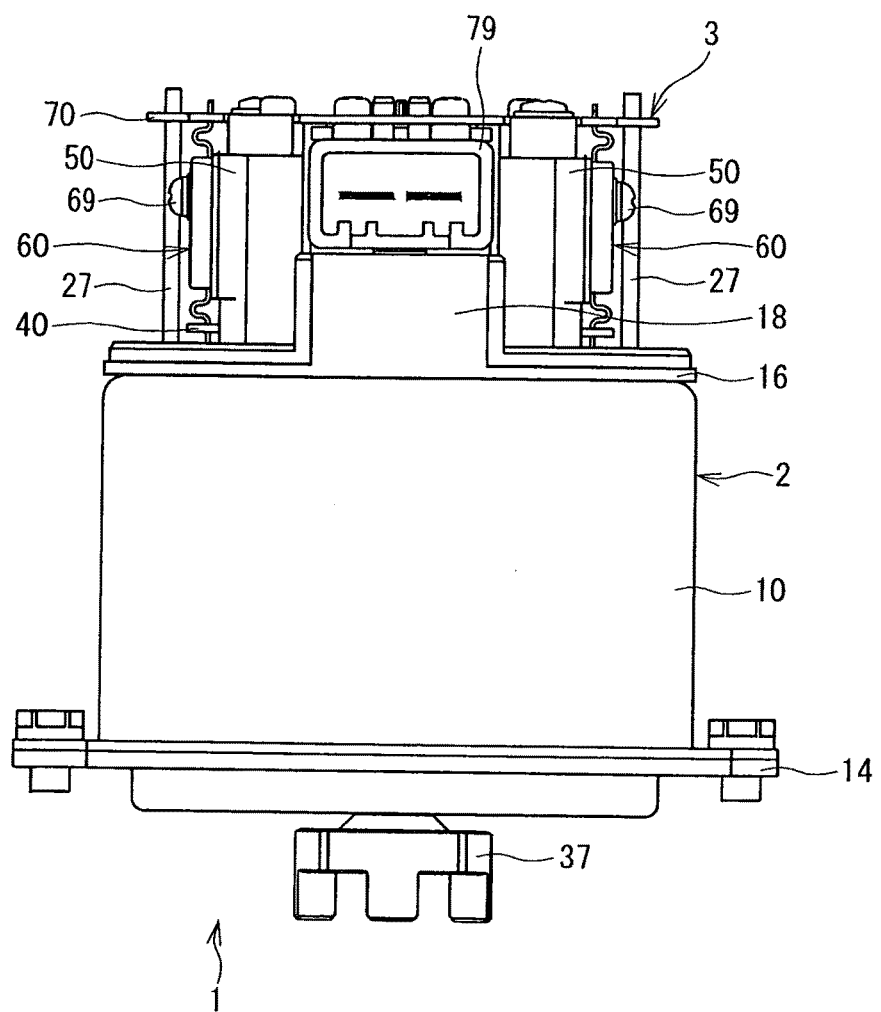
FIG. 4 is a side view of the electric drive apparatus according to the first embodiment viewed in a direction IV in FIG. 3, in which a cover is removed.
Figure 6:
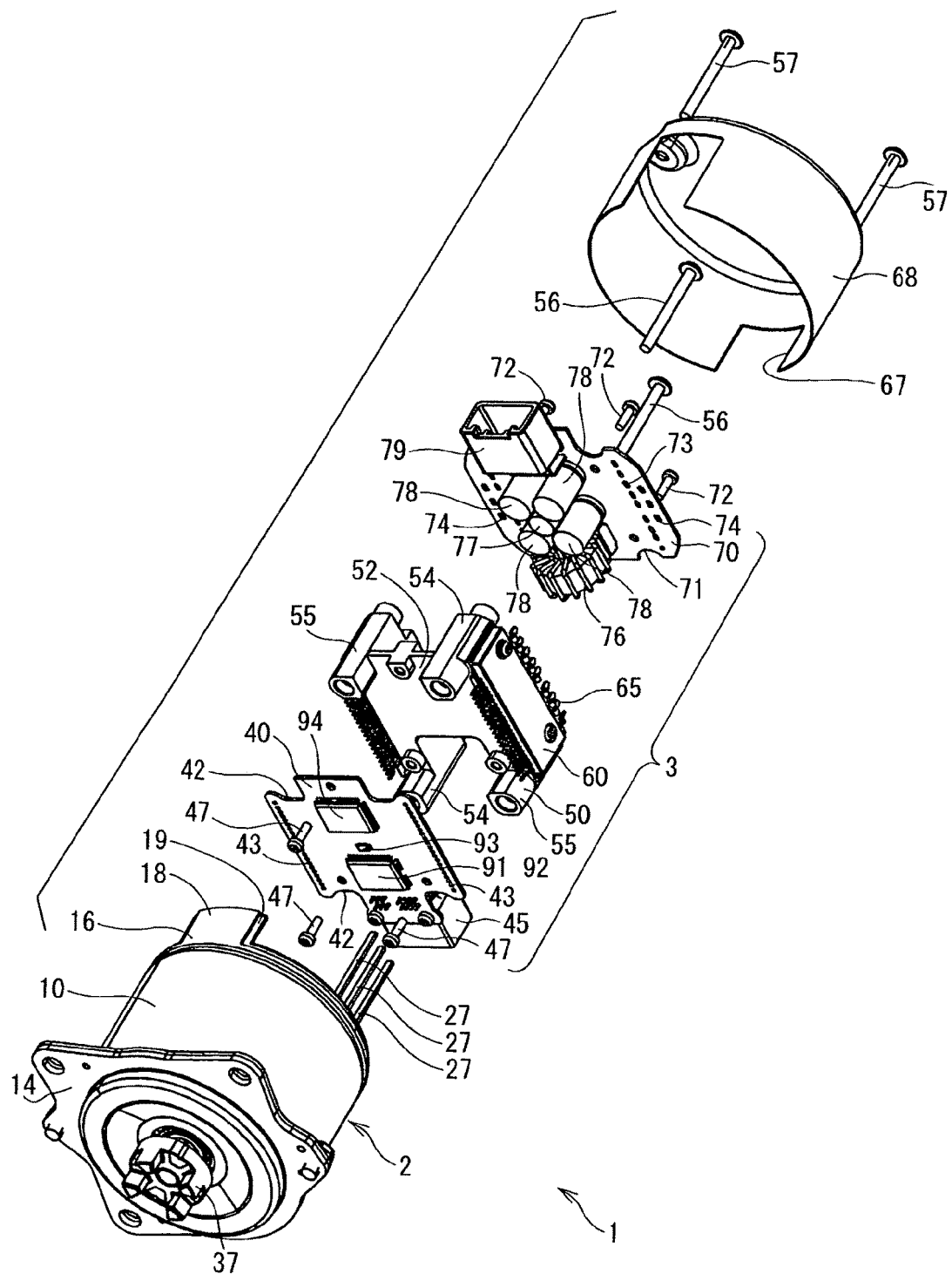
FIG. 6 is an exploded perspective view of the electric drive apparatus according to the first embodiment viewed from a bottom side of the motor.
Figure 7:
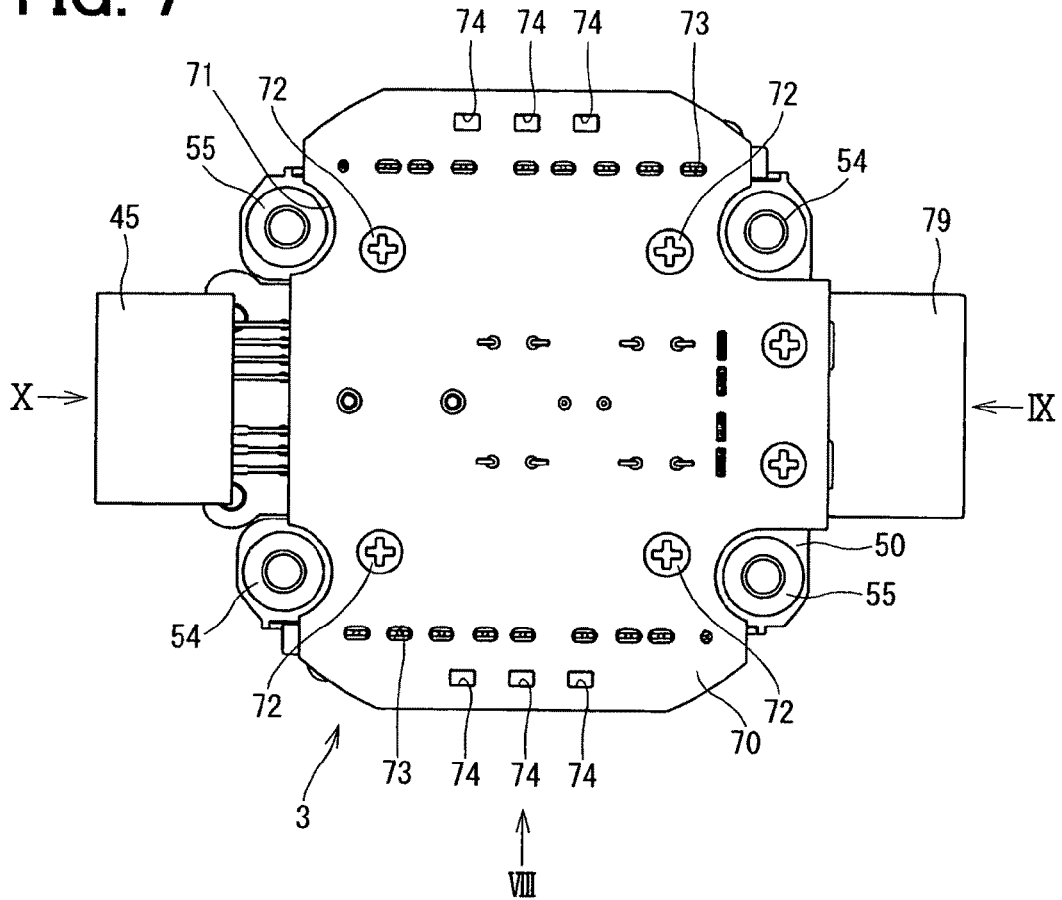
FIG. 7 is a plan view of an electronic control unit used in the electric drive apparatus according to the first embodiment.
Figure 8:
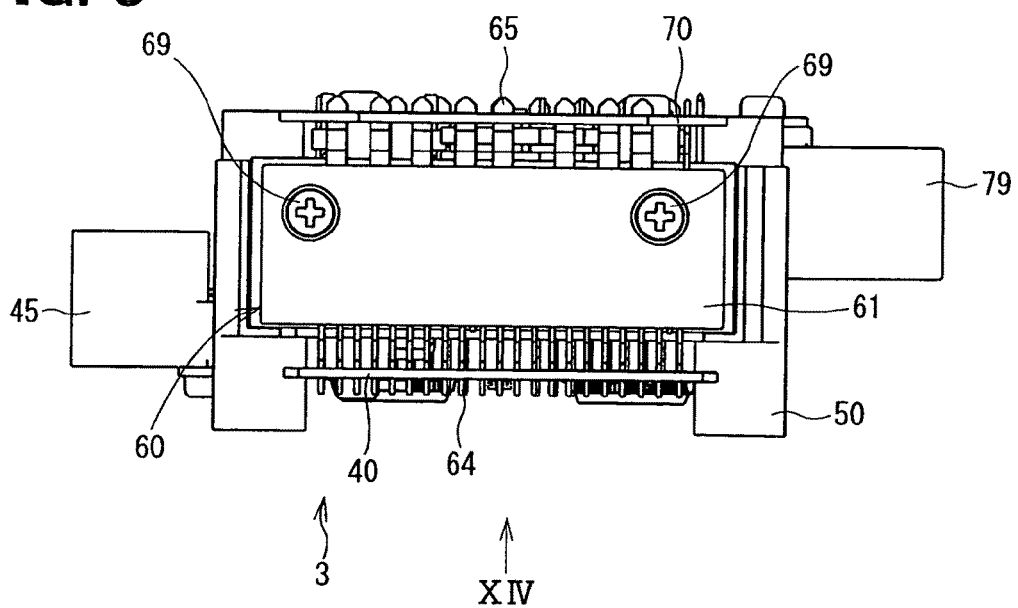
FIG. 8 is a side view of the control unit in the first embodiment viewed in a direction VIII in FIG. 7.
Figure 9:
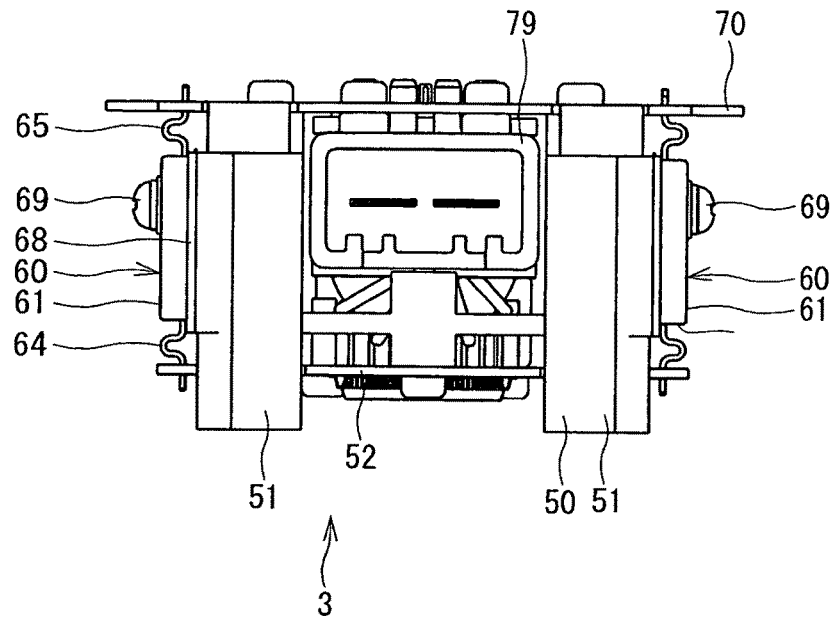
FIG. 9 is a side view of the control unit in the first embodiment viewed in a direction IX in FIG. 7.
Figure 10:
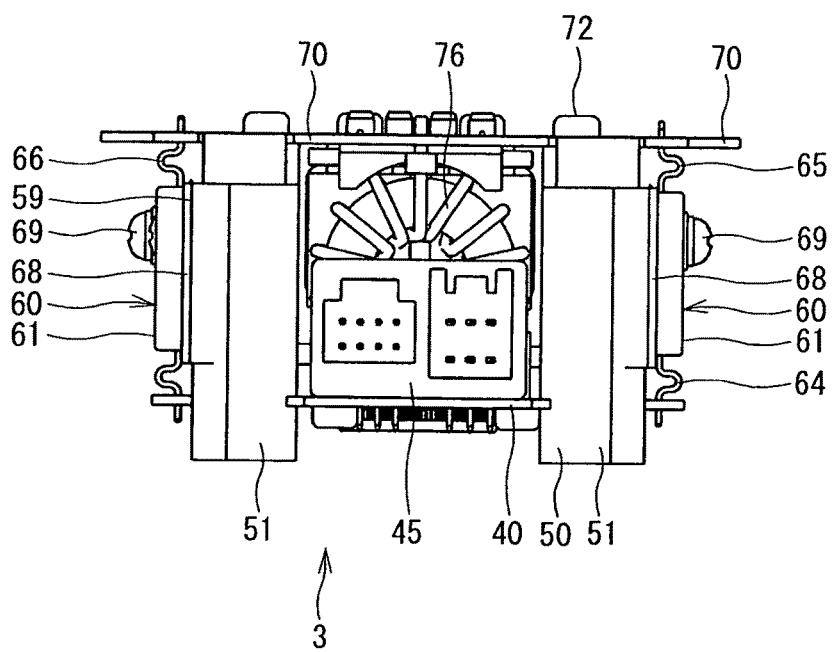
FIG. 10 is a side view of the control unit in the first embodiment viewed in a direction X in FIG. 7.
Figure 11:
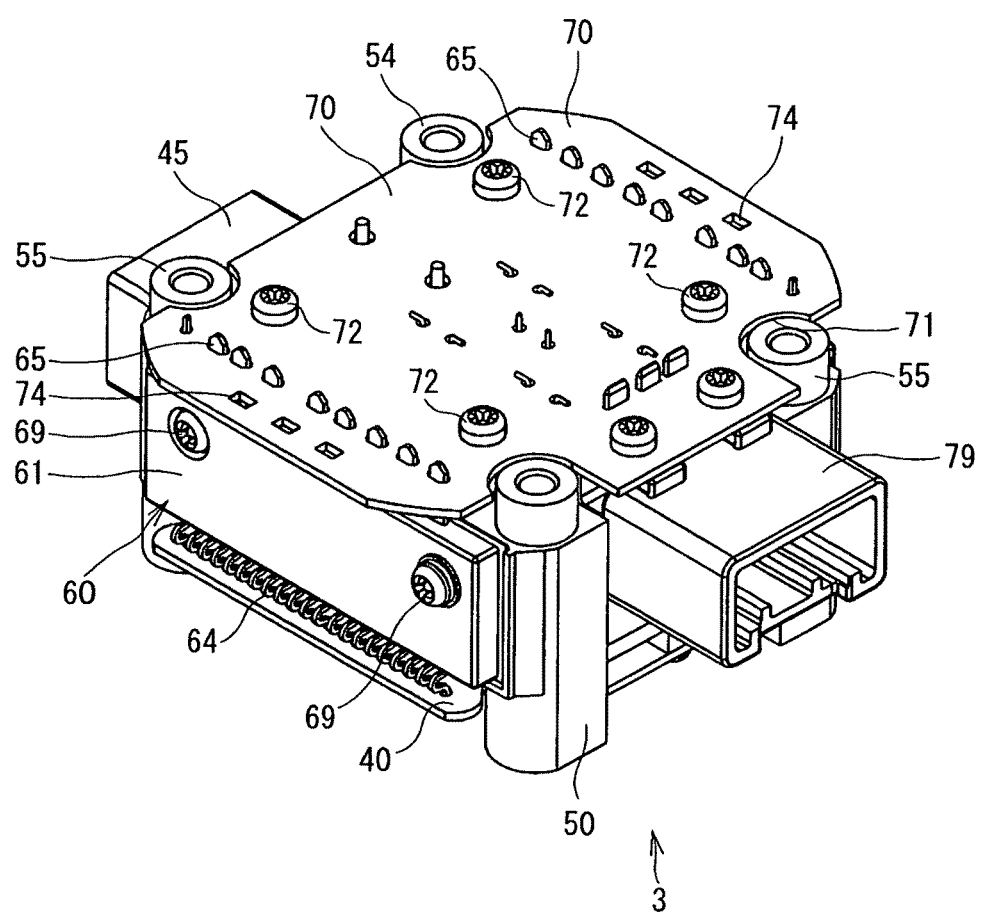
FIG. 11 is a perspective view of the control unit in the first embodiment.

As shown in FIG. 4 to FIG. 6, the shaft 35 has an output end 37 at a position, which is opposite to the control unit 3 relative to the motor case 10. Near the output end 37 of the shaft 35, a gear box (not shown) including therein the gear 7 is provided. The output end 37 is driven to rotate by the shaft 35. The output end 37 is engaged with the gear of the gear box so that driving force is applied to the column shaft 6 by rotation of the shaft 35 of the motor 2.

The control unit 3 is provided within a motor case area, which is formed when the motor case 10 is projected in the axial direction. The control unit 3 has two power modules 60, a power circuit connector 79 as a power source connector, the first smoothing capacitor 77, the second smoothing capacitors 78, the choke coil 76, a heat sink 50, the power circuit substrate 70, the control circuit substrate 40 and the like.

The control circuit substrate 40 is a substrate of four layers formed of, for example, glass epoxy substrate and formed in a generally rectangular plate shape so that it is within the motor case area. The four corners of the control circuit substrate 40 are formed four notches 42 as tolerances for assembling the heat sink 50 to the motor case 10. The control circuit substrate 40 is screw-fitted to the heat sink 50 by screws 47 from the motor 2 side.

A variety of electronic parts forming the control circuit 90 are mounted on the control circuit substrate 40. The pre-driver 91, the customized IC 92, the position sensor 93 and the microcomputer 94 are mounted on the end surface 41 of the control circuit substrate 40 at the motor 2 side. The position sensor 93 is provided at generally the center of the control circuit substrate 40 in facing relation to the magnet 36 of the shaft 35. With this arrangement, rotation of the shaft 35 is detected by detecting changes in magnetic field provided by the magnet 36, which rotates with the shaft 35. The control circuit substrate 40 is formed a number of through holes 43 along the outer periphery of the long side for connection with control terminals of the power modules 60. A control circuit connector 45 is connected to the short side at a position, which is opposite to the motor 2. The control circuit connector 45 is provided to be connectable to electric conductors from the radially outside part of the motor 2, so that sensor information is inputted from the sensors.

The heat sink 50 is formed of two heat radiation blocks 51 and a intermediate part 52, which connects the heat radiation blocks 51. The heat radiation blocks 51 and the intermediate part 52 are formed integrally as a single body by good heat conductive material such as aluminum. The heat radiation blocks 51 are provided to face each other sandwiching an imaginary plane, which includes a rotation center of the shaft 35.

The heat radiation blocks 51 are each formed in a wide column shape. Each heat radiation block 51 has connection parts 54 and 55 at its both ends. The connection parts 54 and 55 are formed through holes in the axial direction of the motor 2. Screws 56 are inserted in the connection parts 54 and screwed to the motor case 10. Further, screws 57 are inserted in the connection part 55 and screwed to the motor case 10 together with a cover 68.

Figure 12:
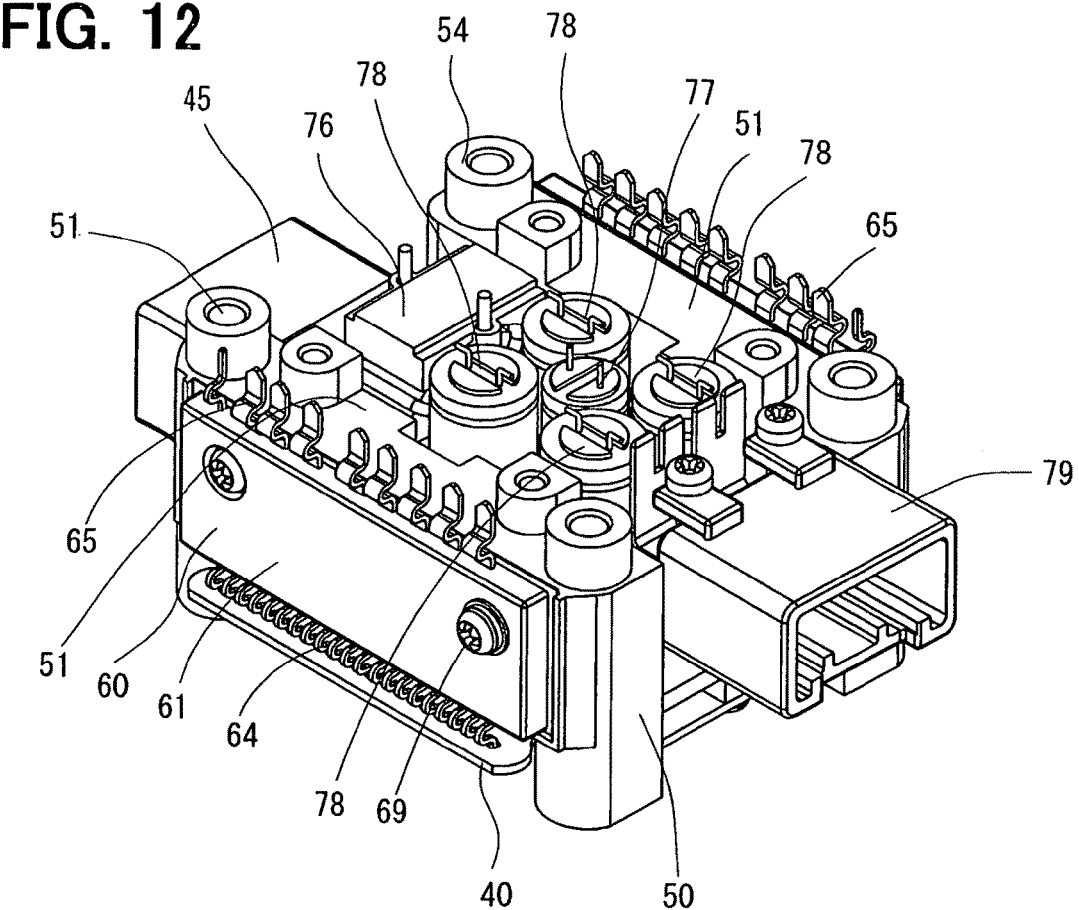
FIG. 12 is a perspective view of the control unit in the first embodiment, in which a power circuit substrate is removed in FIG. 11.
Figure 13:
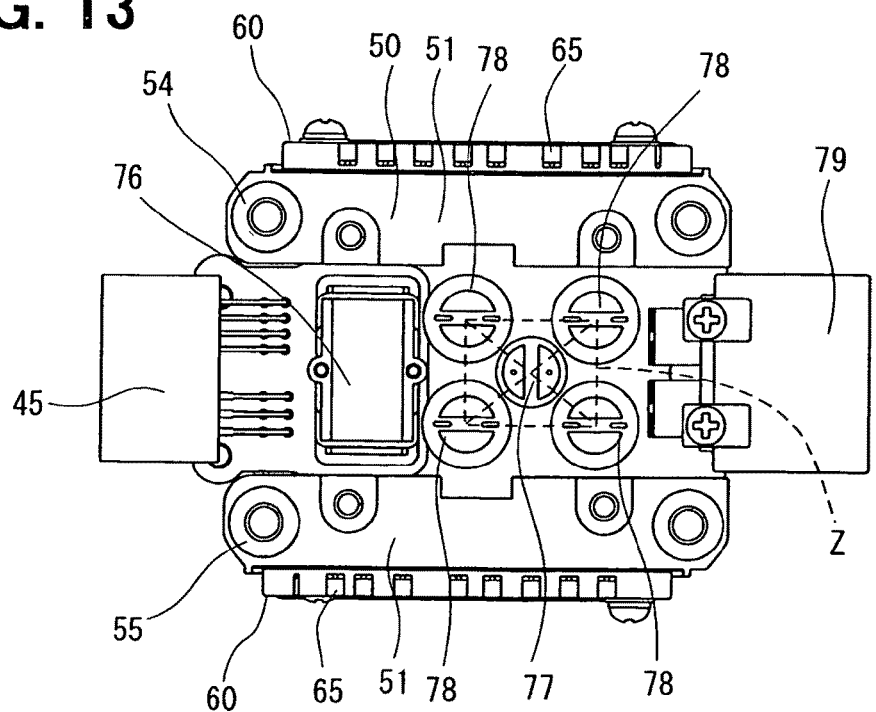
FIG. 13 is a plan view of the control unit in the first embodiment, in which the power circuit substrate is removed in FIG. 7.
Figure 14:
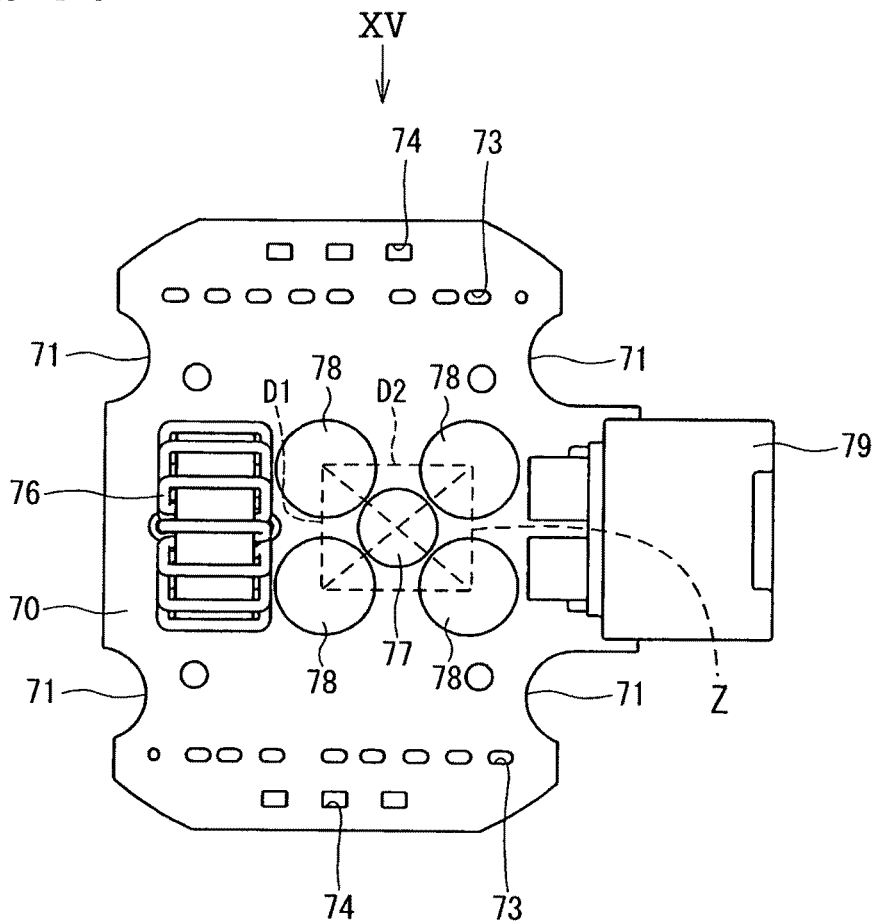
FIG. 14 is a plan view of the control unit in the first embodiment viewed in a direction XIV in FIG. 8, and in which a heat sink and the control circuit substrate are removed.
Figure 15:
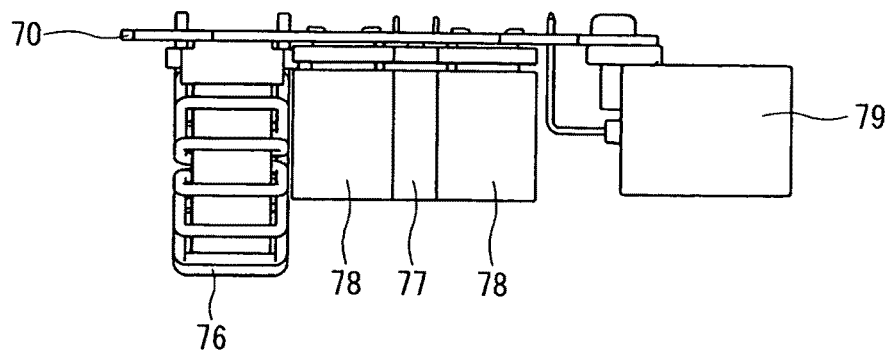
FIG. 15 is a side view of the control unit in the first embodiment, in which the heat sink and the control circuit substrate are removed.
Figure 16:
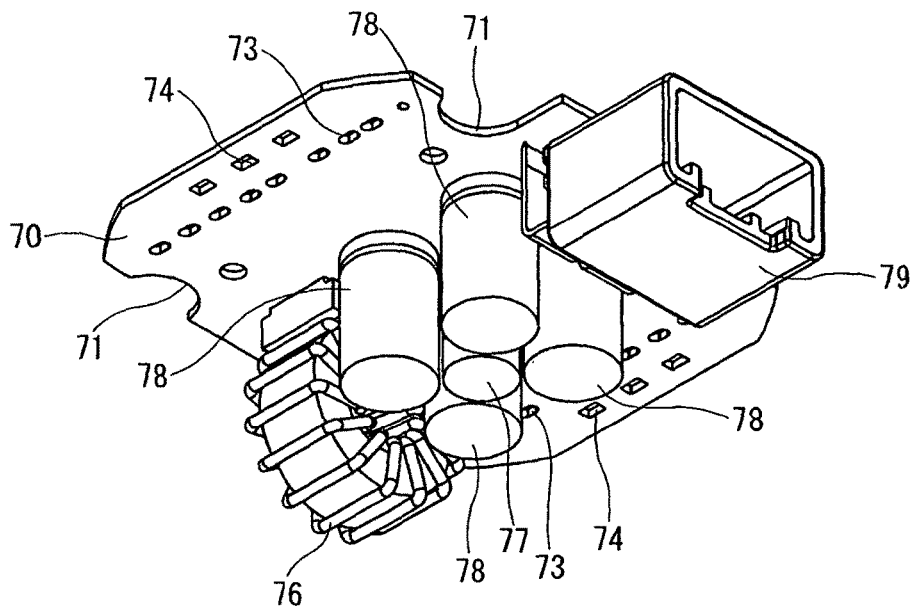
FIG. 16 is a perspective view of the control unit in the first embodiment, in which the heat sink and the control circuit substrate is removed.
Figure 17:
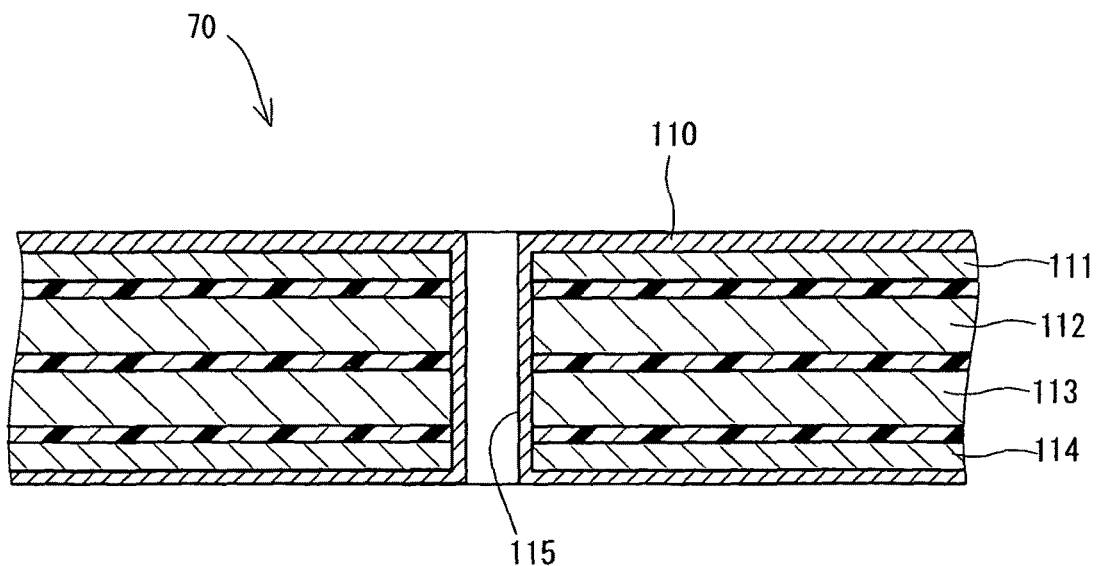
FIG. 17 is a sectional view of the power circuit substrate of the control unit in the first embodiment.

The control unit 3 is shown in FIG. 7 to FIG. 16. In FIGS. 12 and 13, however, the power circuit substrate 70 is not shown. In FIGS. 14 to 16, the heat sink 50 and the control circuit substrate 40 are not shown.

The power modules 60 are located in generally parallel with the shaft 35 at a position outside the heat sink 50 in the radial direction of the motor 2. Each power module 60 is arranged on each heat radiation block 51 of the heat sink 50. The power module 60 has semiconductor chips, which form FETs but are not shown, conductor patterns formed of copper, a mold part 61 molding the semiconductor chips therein, control terminals 64 protruding from one side of the mold part 61 and power terminals 65 protruding from the other side of the mold part 61.

The power modules 60 are screw-fitted to the heat sink 50 by screws 69. Heat generated by the power modules 60 are radiated to the heat sink 50 through the heat radiation sheet.

In the power module 60, the semiconductor chips, the shunt resistors 66 and the like are mounted on conductor patterns formed of copper and molded by the resin mold part 61.

One of the power modules 60 resin-molds the inverter circuit 80 shown in FIG. 1 integrally in a single body. The other of the power modules 60 also resin-molds the inverter circuit 89 integrally in a single body.

As shown in FIG. 12 to FIG. 16, the first smoothing capacitor 77, the second smoothing capacitors 78 and the choke coil 76 are located within a space formed between the heat radiation blocks 51 of the heat sink 50. The number of the second smoothing capacitors 78 is four, specifically two for the inverter circuit 80 and two for the inverter circuit 89. These are large-sized electronic parts and are provided between two power modules 60. These large-sized electronic parts are mounted on one surface of the power circuit substrate 70, which is at the motor 2 side.

The first smoothing capacitor 77 and the second smoothing capacitors 78 are aluminum electrolytic capacitors. The second smoothing capacitor 78 is larger in outer diameter than the first smoothing capacitor 77 and has larger capacitance. The first smoothing capacitor 77 and the second smoothing capacitors 78 are formed generally in a cylindrical shape. The first smoothing capacitor 77 and the second smoothing capacitors 78 are arranged such that respective axes are generally in parallel with the axis of the shaft 35 of the motor 2.

As shown in FIG. 14, a distance D1 between the second smoothing capacitors 78 located at one heat radiation block 51 side and the other heat radiation block 51 side is shorter than a distance D2 between the second smoothing capacitors 78 located at either of one heat radiation block 51 side or the other heat radiation block 51 side. For this reason, the four second smoothing capacitors 78 are arranged such that an imaginary line Z, which is formed in a triangle shape by connecting the axes of the four smoothing capacitors 78 as shown in FIGS. 13 and 14, generally forms a rectangle when viewed from one axial end side of the shaft 35 in the axial direction. The first smoothing capacitor 77 is arranged such that its axis is located on a cross-point of diagonal lines of the imaginary line Z when viewed from one axial end side of the shaft 35 in the axial direction. The first smoothing capacitor 77 and the four second smoothing capacitors 78 are arranged closely with respective spacing being equal to or less than 2 mm.

The choke coil 76 is formed generally in a tubular or ring shape, the axial length of which is shorter than the outer diameter of the same. The choke coil 76 is arranged such that its axis is perpendicular to the axis of the shaft 35. The choke coil 76 is located outside the imaginary line Z of the rectangle when viewed in the axial direction from the one axial end side of the shaft 35. The choke coil 76 is arranged not to overlap the shaft 35 when viewed in the axial direction from one axial end side of the shaft 35.

The power circuit connector 79 is provided at a side radially opposite to the control circuit connector 45 as shown in FIG. 13. The power circuit connector 79 is provided such that electric conductors may be connectable from radially outside of the motor 2 and is connected to the power source 75. Thus, the power circuit substrate 70 is supplied with electric power through the power circuit connector 79. The power from the power source 75 is supplied to the coils 26 wound on the stator 20 through the power circuit connector 79, the power circuit substrate 70, the power modules 60 and the motor leads 27.

The control unit 3 is accommodated within the cover 68 shown in FIG. 1 to FIG. 6. The cover 68 is formed of magnetic material such as iron to prevent electric field from leaking outside from the control unit 3 side and prevent dust and the like from entering into the control unit 3 side. The cover 68 has generally the same diameter as the motor case 10 and is formed in a bottomed cylindrical shape, which opens to the motor 2 side. The cover 68 is screw-fitted to the motor case 10 with the heat sink 50 by screws 57. Notches or recesses 67 are formed in the cover 68 at positions, which correspond to the control circuit connector 45 and the power circuit connector 79. The control circuit connector 45 and the power circuit connector 79 are exposed to open in the radially outward directions from the recesses 67. A protrusion 18 is formed at positions corresponding to the recess 67 provided at the power circuit connector 79 side of the resin guide 16. The resin guide 16 is formed a step part 19 to be fit with the cover 68.

The conductor patters formed on the power circuit substrate 70 is described with reference to FIG. 1 and FIGS. 17 to 20. The power circuit substrate 70 has a four-layered structure. Each of a first layer 111 and a fourth layer 114 has a thickness of about 35 μm. Each of a second layer 112 and a third layer 113 has a thickness of about 70 μm. Since a plating layer 110 of thickness of about 20 μm, for example, is formed on the power circuit substrate 70, each of the first layer 111 and the fourth layer 114 results in having a total thickness of about 55 μm. The first layer 111 to the fourth layer 114 are connected by the plating layer 110 of via holes 115.

Figure 18:
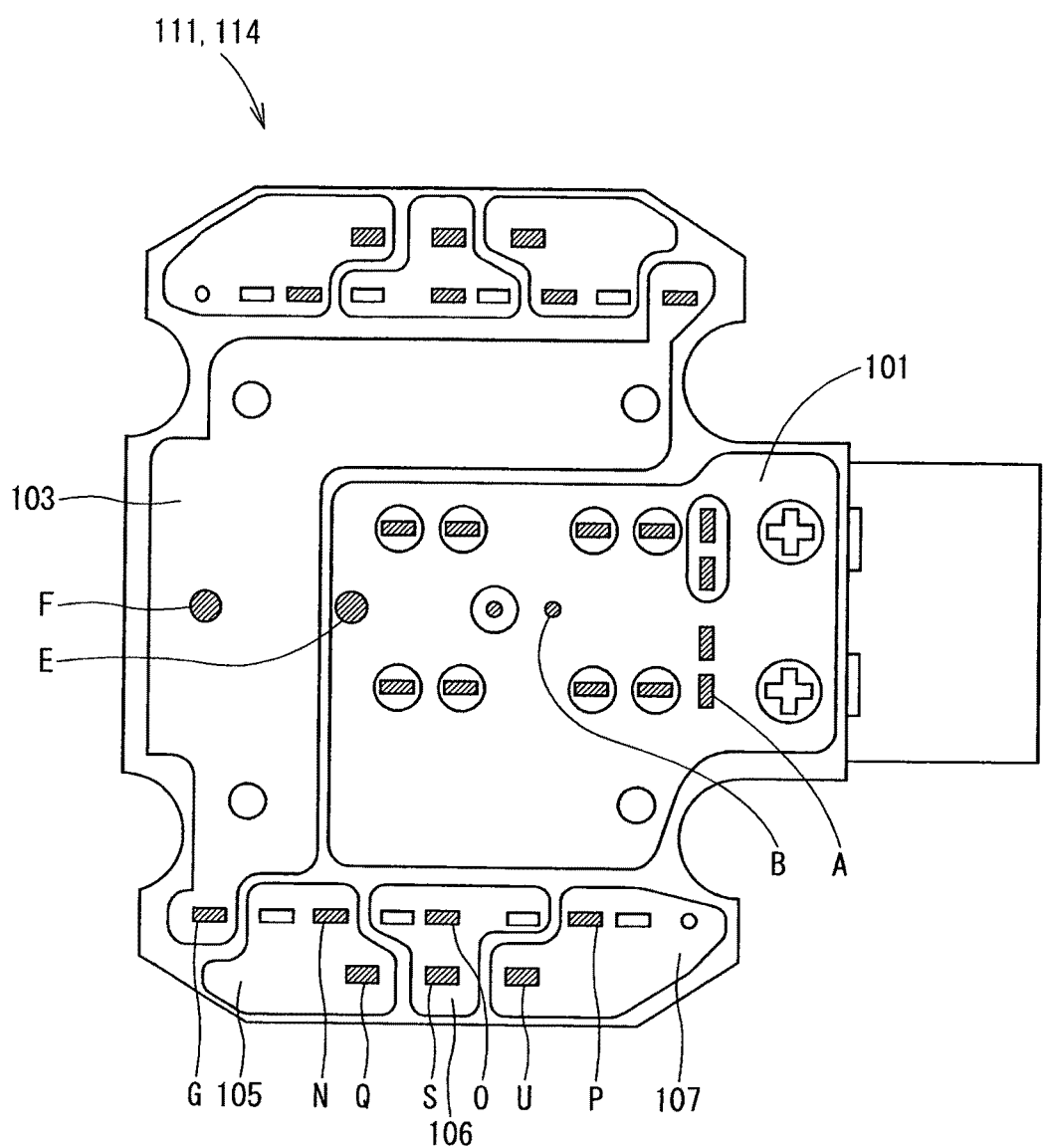
FIG. 18 is a plan view showing a first layer and a fourth layer of the power circuit substrate in the first embodiment.
Figure 19:
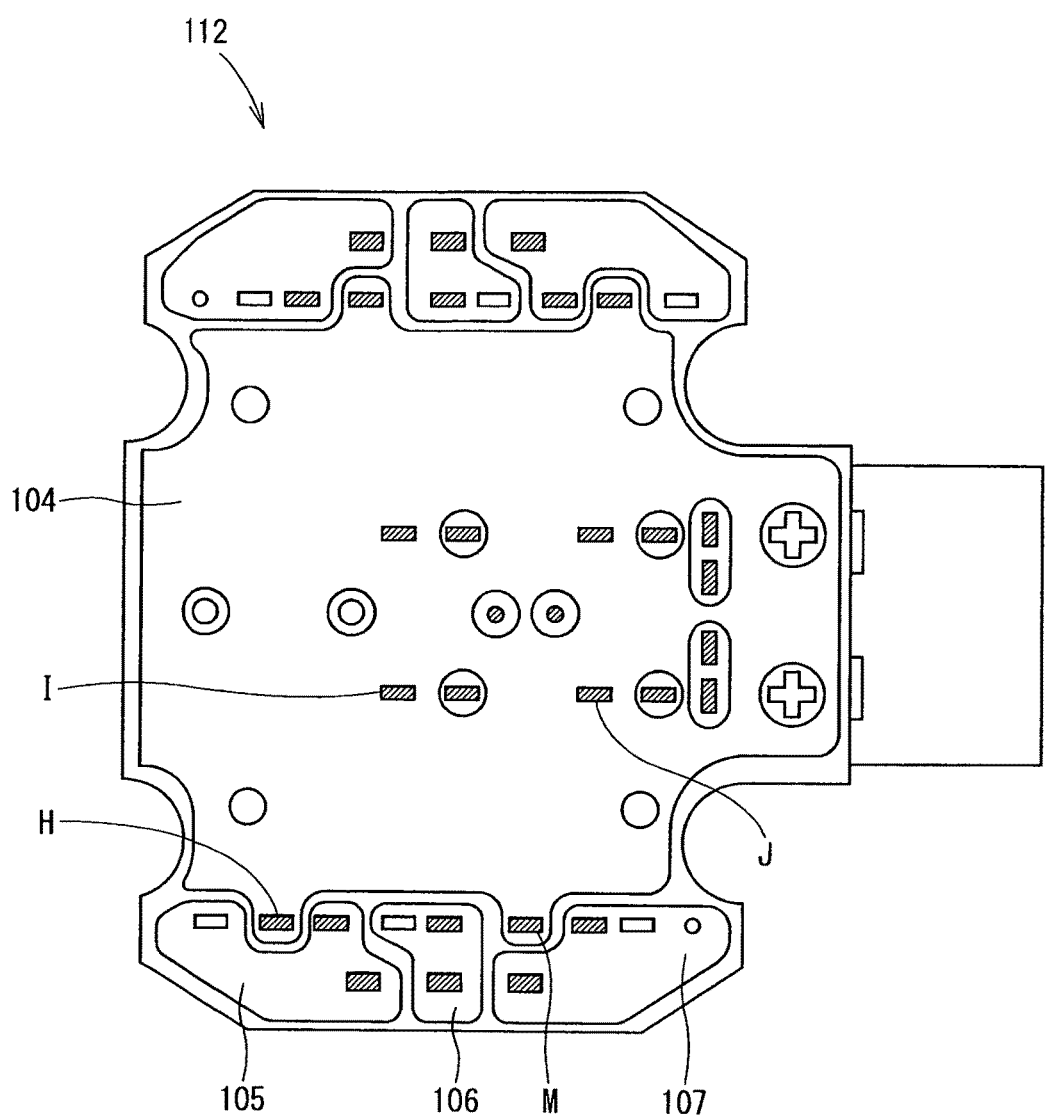
FIG. 19 is a plan view showing a second layer of the power circuit substrate in the first embodiment.
Figure 20:
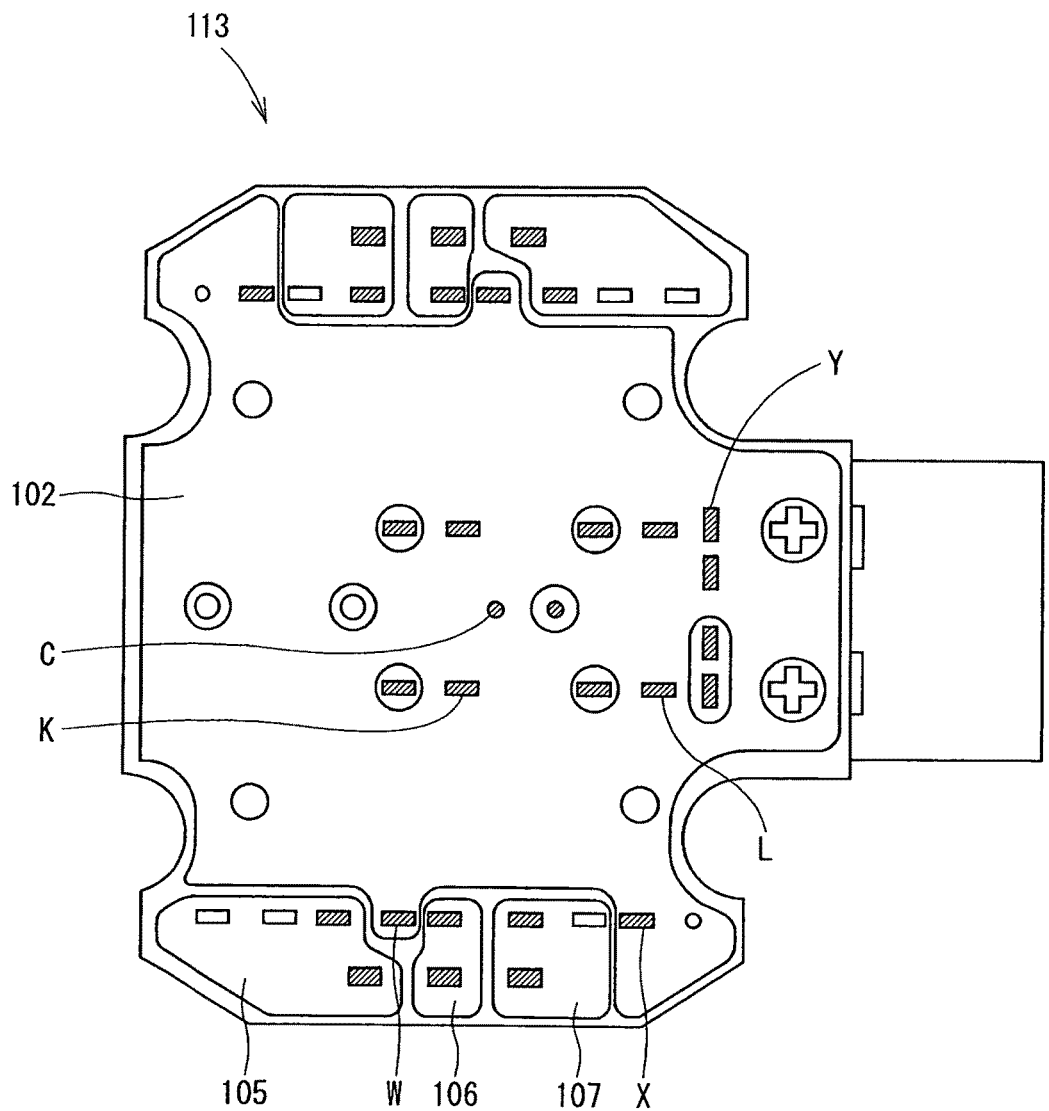
FIG. 20 is a plan view showing a third layer of the power circuit substrate in the first embodiment.
Figure 21:
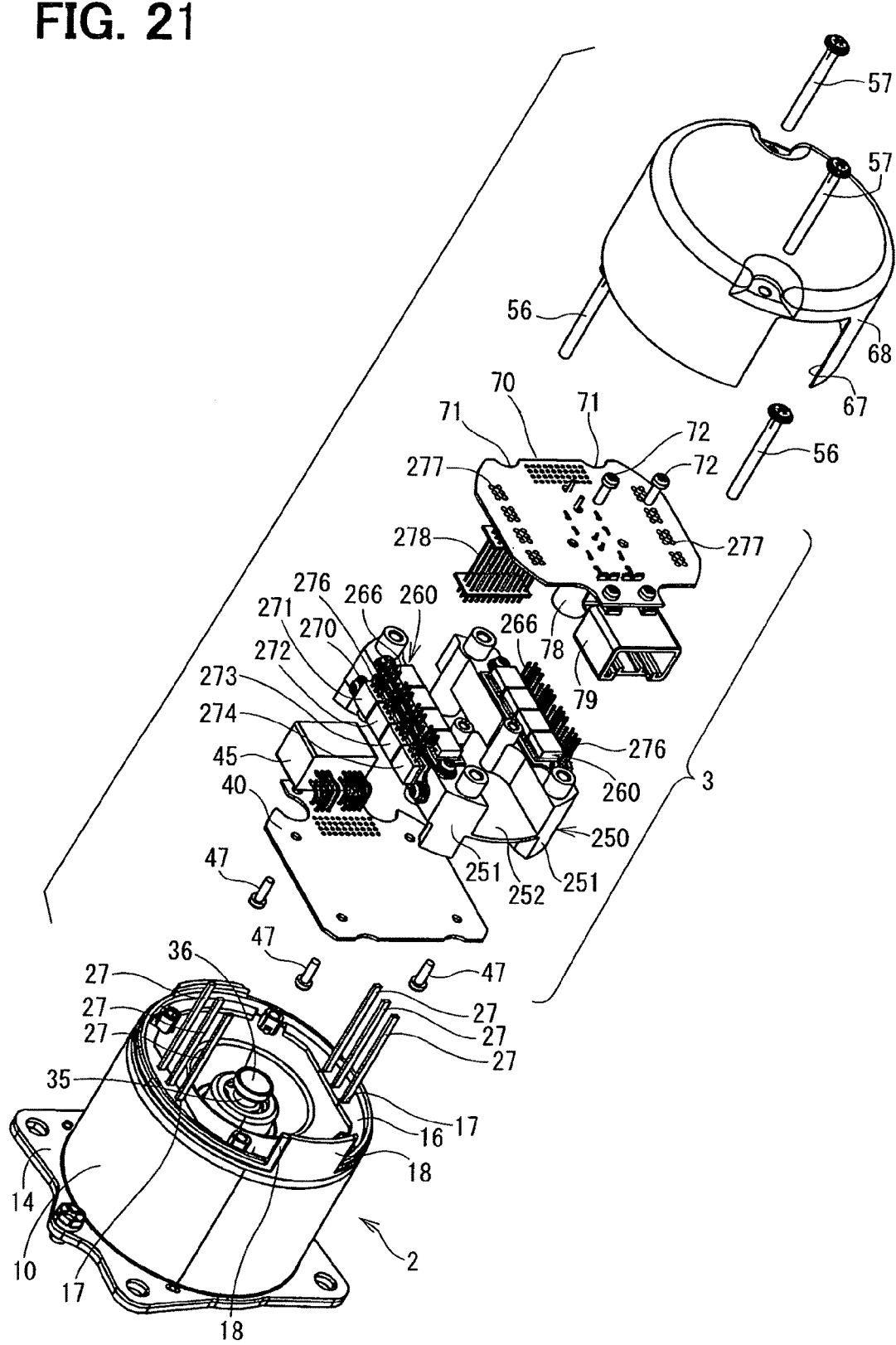
FIG. 21 is an exploded perspective view of an electric drive apparatus according to a second embodiment of the present invention.
Figure 22:
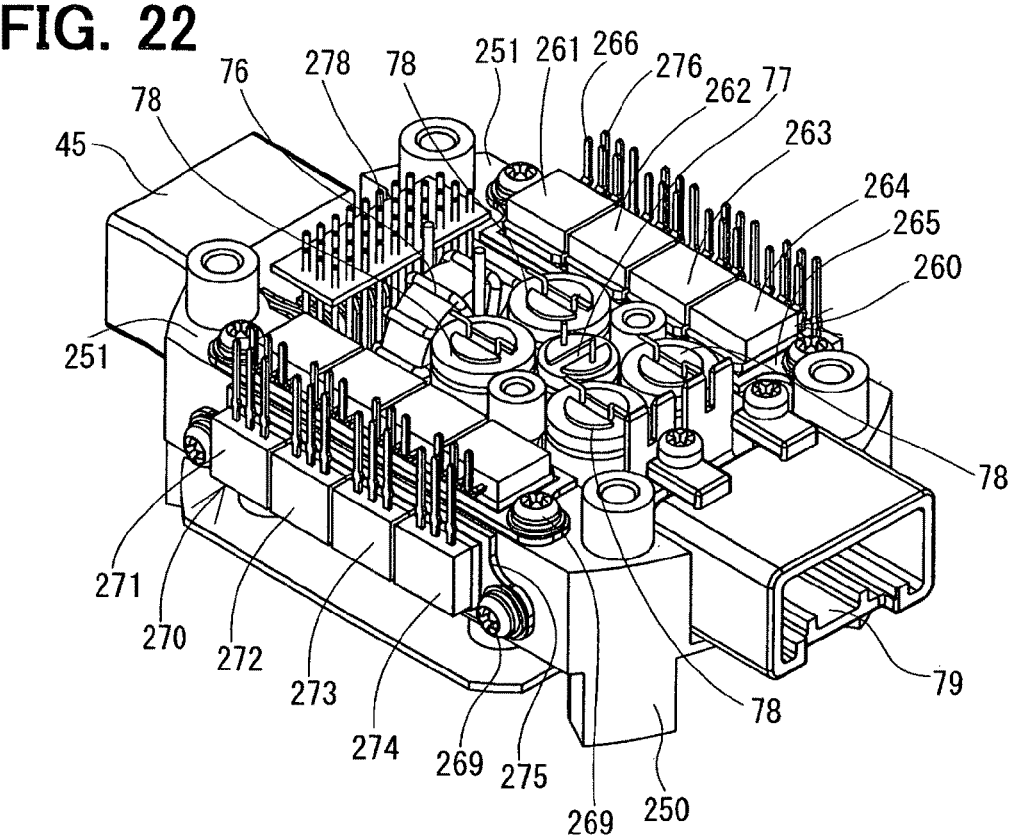
FIG. 22 is a perspective view of a control unit used in the electric drive apparatus according to the second embodiment, in which a power circuit substrate is removed.
Figure 23:
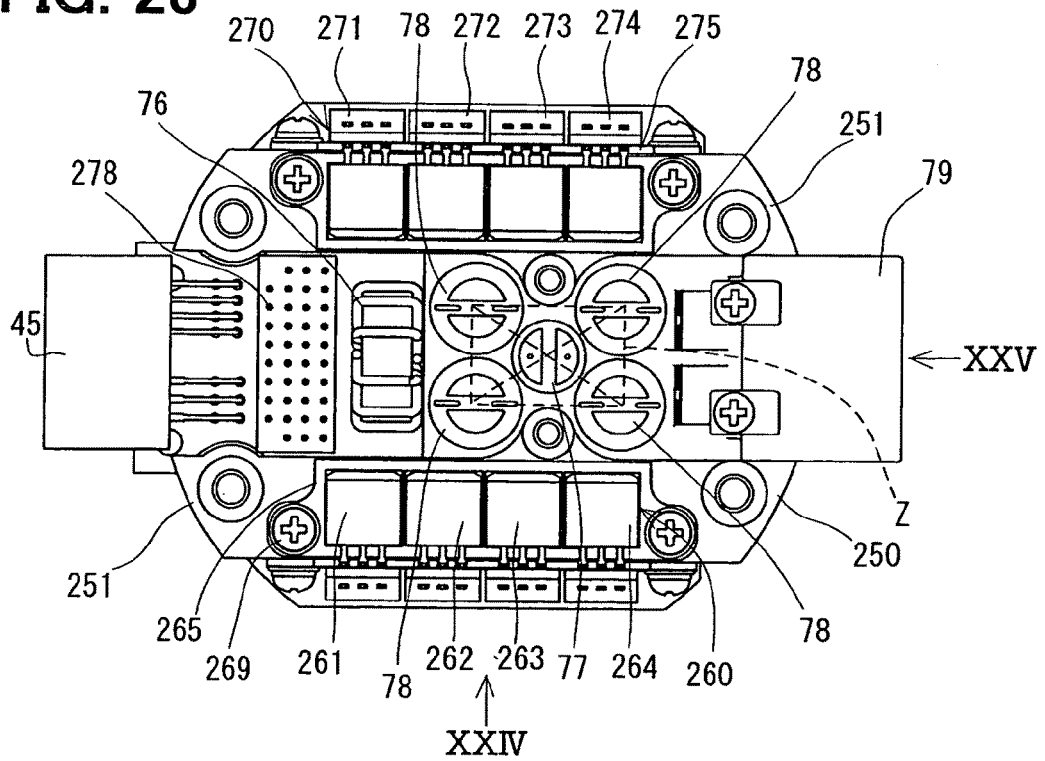
FIG. 23 is a plan view of the control unit in the second embodiment, in which the power circuit substrate is removed.
Figure 24:
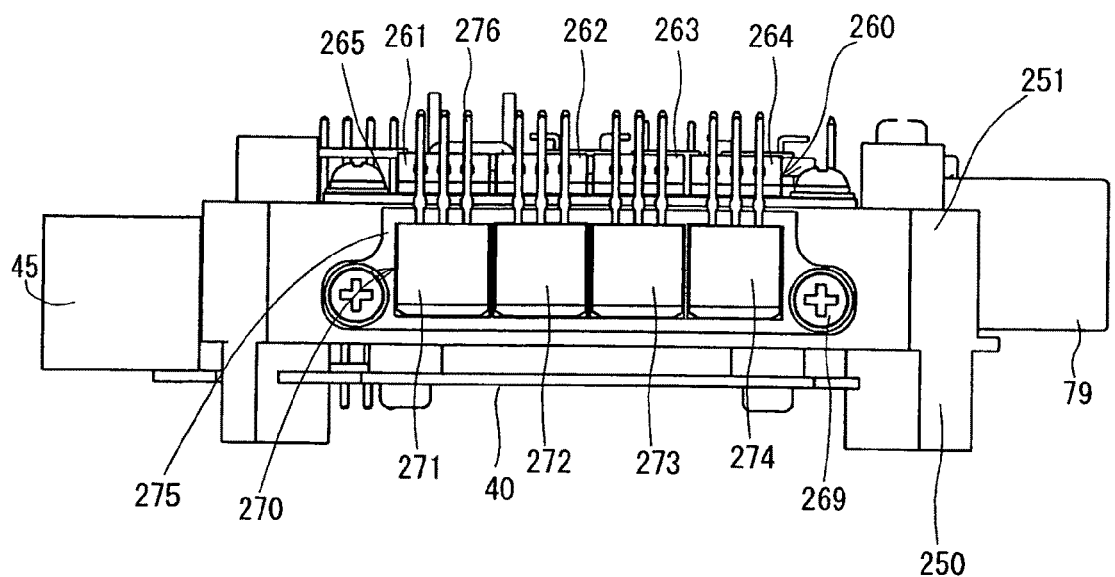
FIG. 24 is a side view of the control unit in the second embodiment viewed in a direction XXIV in FIG. 23.
Figure 25:
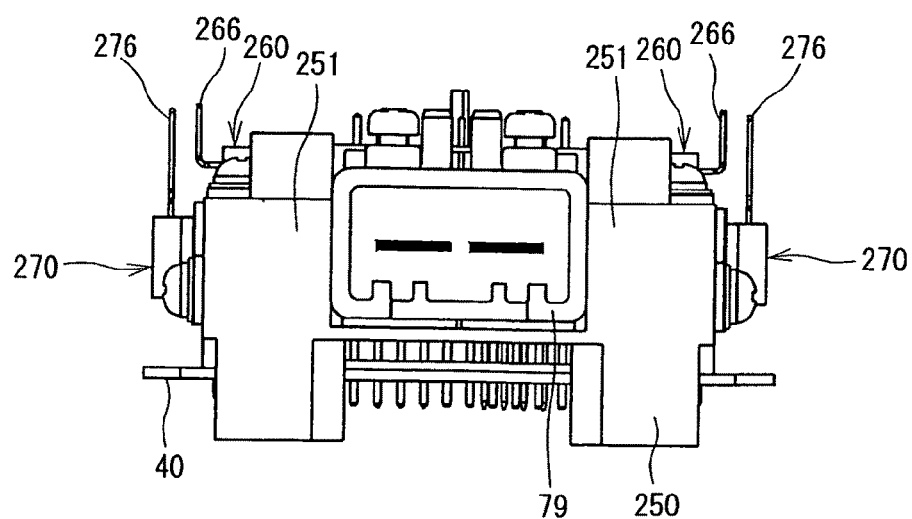
FIG. 25 is a side view of the control unit in the second embodiment viewed in a direction XXV in FIG. 23.

The conductor patterns of the first layer 111 and the fourth layer 114 are shown in FIG. 18. The conductor pattern of the second layer 112 is shown in FIG. 19. The conductor pattern of the third layer 113 is shown in FIG. 20. Wide conductors 101 to 107 are formed on the first layer 111 to the fourth layer 114. Flow of current through the conductors 101 to 107 formed on the first layer 111 to the fourth layer 114 is described. The current supplied from the power source 75 flows from a terminal A of the power circuit connector 79 to the conductor 101 of the first layer 111 and the fourth layer 114. Noise components are absorbed from the conductor 101 to the conductor 102 of the third layer 113 through lead wires B and C of the first smoothing capacitor 77, and then absorbed from the conductor 102 to the ground through a terminal Y of the power circuit connector 79.

The current flows from the conductor 101 of the first layer 111 and the fourth layer 114 to the conductor 103 through lead wires E and F of the choke coil 76. The current flows from the conductor 103 to the power supply relays 87 and 88 of the power module 60 through a power terminal G. The current flows from the power supply relays 87 and 88 to the conductor 104 of the second layer 112 through a power terminal H. The current flows from the conductor 104 to the corresponding coils, that is, the U-phase coil, the V-phase coil and the W-phase coil, through the FETs 81 to 83 of high-potential side, power terminals N, O and P, the conductors 105 to 107 of the first to the fourth layers 111 to 114, and the motor wires Q, S and U.

The current flows from the U-phase coil, the V-phase coil and the W-phase coil to the conductor 102 of the third layer 113 through the motor wires Q, S and U, corresponding FETs 84 to 86 of low-potential side, the shunt resistors 99, the power terminals W and X. The current flows form the conductor 102 to the ground through the terminal Y of the power circuit connector 79. The second smoothing capacitor 78 connects one lead wire I, J to the conductor 104 of the second layer 112 and the other lead wire K, L to the conductor 102 of the third layer 113 to assist power supply to the FETs 81 to 86. The second smoothing capacitor 78 also absorbs ripple currents generated by switching of the FETs 81 to 86.

In operation of the electric drive apparatus 1, the microcomputer 94 provided on the control circuit substrate 40 generates a pulse signal through the pre-driver 91, which is formed by PWM control, to assist steering of the steering wheel 5 in accordance with a travel speed of a vehicle based on signals supplied from the position sensor 93, the torque sensor 8, the shunt resistors 99 and the like.

This pulse signal is outputted to the inverter circuits 80 and 89 of the systems formed by the power modules 60 through the control terminals 64 so that on/off switching operation of the FETs 81 to 86 of the power modules 60 are controlled. Thus sinusoidal wave currents, which are phase-shifted one another, are supplied to the coils 26 so that a rotating magnetic field is generated. The rotor 30 and the shaft 35 are rotated as a single body by the rotating magnetic field. With rotation of the shaft 35, driving force is outputted from the output end 37 to the gear 7 of the column shaft 6 so that steering operation of a driver by the steering shaft 5 is assisted.

The electric drive apparatus 1 according to the first embodiment provides the following advantages.

(1) The first smoothing capacitor 77, the second smoothing capacitors 77 and the choke coil 76 are arranged between the power modules 60. The second smoothing capacitors 78 are arranged such that the imaginary line Z, which connects the axes of the second smoothing capacitors 78, forms a rectangle shape, when viewed in the axial direction from one axial end side of the shaft 35. The first smoothing capacitor 77, the diameter of which is smaller than that of the second smoothing capacitors 78, is located such that its axis is located on the cross-point of the diagonal lines of the imaginary line Z of the rectangle. As a result, a space for arranging the first smoothing capacitor 77 and the second smoothing capacitors 78 can be sized small. By thus reducing the size of the control unit 3, the electric drive apparatus 1 can be sized compact.

(2) The choke coil 76 is arranged such that its axis is perpendicular to the axis of the shaft 35 of the motor 2. By adjacently positioning the outside wall of the choke coil 76 in the axial direction and the second smoothing capacitors 78, the space for arranging the first smoothing capacitor 77, the second smoothing capacitors 78 and the choke coil 76 can be reduced in size.

(3) The first smoothing capacitor 77, the second smoothing capacitors 78 and the choke coil 76 are provided between the power modules 60. As a result, the conductors 101 to 107, which electrically connect these large electronic parts and the power terminals 65 of the power module 60, can be made short and wide. The impedance of the conductors 101 to 107 is made low. The performance of the first smoothing capacitor 77 and the second smoothing capacitors 78 can thus be improved and the power source noise can be reduced.

(4) The first smoothing capacitor 77 and the choke coil 76 are provided between the power modules 60. As a result, the impedance from the power source 75 to the power supply relays 87 and 88 through the choke coil 76 can be lowered. Further, by locating the second smoothing capacitors 78 between the power modules 60, the impedance of the inverter circuits 80 and 89 can be reduced. Thus, reduction of current supplied from the power source 75 to the motor 2 can be suppressed. The output torque of the motor 2 can thus be increased. As long as the output torque of the motor 2 is the same, heat generation by the FETs 81 to 88 and the conductors 101 to 107 can be suppressed.

(5) The heat radiation blocks 51 of the heat sink 50, which are provided outside the first smoothing capacitor 77, the second smoothing capacitors 78 and the choke coil 76, extend generally in parallel to the long side of the rectangle defined by the imaginary line Z when viewed in the axial direction of the shaft 35. As a result, the outer periphery of the first smoothing capacitor 77, the second smoothing capacitors 78, the choke coil 76, the power modules 60 and the heat sink 50 can be reduced in size such that the control unit 3 can be formed within the outside diameter of the motor case 10, which is generally in the cylindrical shape. Thus, the size of the electric drive apparatus 1 can be reduced.

Second Embodiment

An electric drive apparatus according to a second embodiment of the present invention is shown in FIGS. 21 to 29. According to the second embodiment, a heat sink 250 has two heat radiation blocks 251. Two module units 260 and 270 are provided for each of the heat radiation blocks 251. That is, four module units 260 and 270 are mounted on the heat sink 250.

One module unit 260 is arranged on a top outer wall of the heat radiation block 251, which is at the power circuit substrate 70 side. The other module unit 270 is arranged on a side outer wall of the heat radiation block 251. That is, the semiconductor module unit 260 is arranged to be generally perpendicular to the center of rotation of the shaft 35, and the semiconductor module unit 270 is arranged to be generally in parallel to the center of rotation of the shaft 35.

The semiconductor module units 260 and 270 has four semiconductor modules 261 to 264 and 271 to 274 as well as metal substrates 265 and 275, respectively. The semiconductor module units 260 and 270 are screw-fitted to the heat sink 250 by fixing the metal plates 265 and 275 by screws 269 through heat radiation sheets, respectively. The semiconductor modules 261 to 264 and 271 to 274 are power modules.

Three terminals 266 (gate, source and drain) protrude from each of the semiconductor modules 261 to 264 of the semiconductor module unit 260, which is on the outer top wall of the heat radiation block 251, are bent generally perpendicularly to extend toward the power circuit substrate 70 side. Three terminals 276 (gate, source and drain) protrude from each of the semiconductor modules 271 to 274 of the semiconductor module unit 270, which are on the outer side wall of the heat radiation block 251, extend toward the power circuit substrate 70 side. The terminals 266 and 276 of the semiconductor modules 261 to 264 and 271 to 274 are inserted into through holes 277 formed in the power circuit substrate 70 and electrically connected to the power circuit substrate 70 by soldering or the like.

The semiconductor modules 261 to 264 of the semiconductor module unit 260, which is arranged on the top outer wall of the heat radiation block 251 facing the power circuit substrate 70, correspond to the power supply relay 87 and the FETs 81 to 83 of one inverter circuit 80. The semiconductor modules 271 to 274 of the semiconductor module unit 270, which is arranged on the outer side wall of the heat radiation block 251 facing in the radial direction of the motor 2, correspond to the power supply relay 88 and the FETs 84 to 86 of one inverter circuit 80.

The semiconductor modules 261 to 264 and 271 to 274 of the semiconductor module units 260 and 270, which are arranged on the other heat radiation block 251, correspond to the power supply relays 87 and 88 and the FETs of the other inverter circuit 89.

According to the second embodiment, similarly to the first embodiment, the first smoothing capacitor 77, the second smoothing capacitors 78 and the choke coil 76 are arranged within a space formed between two heat radiation blocks 51 of the heat sink 50. These large-sized electronic parts are provided between the four power modules 260 and 270.

Figure 26:
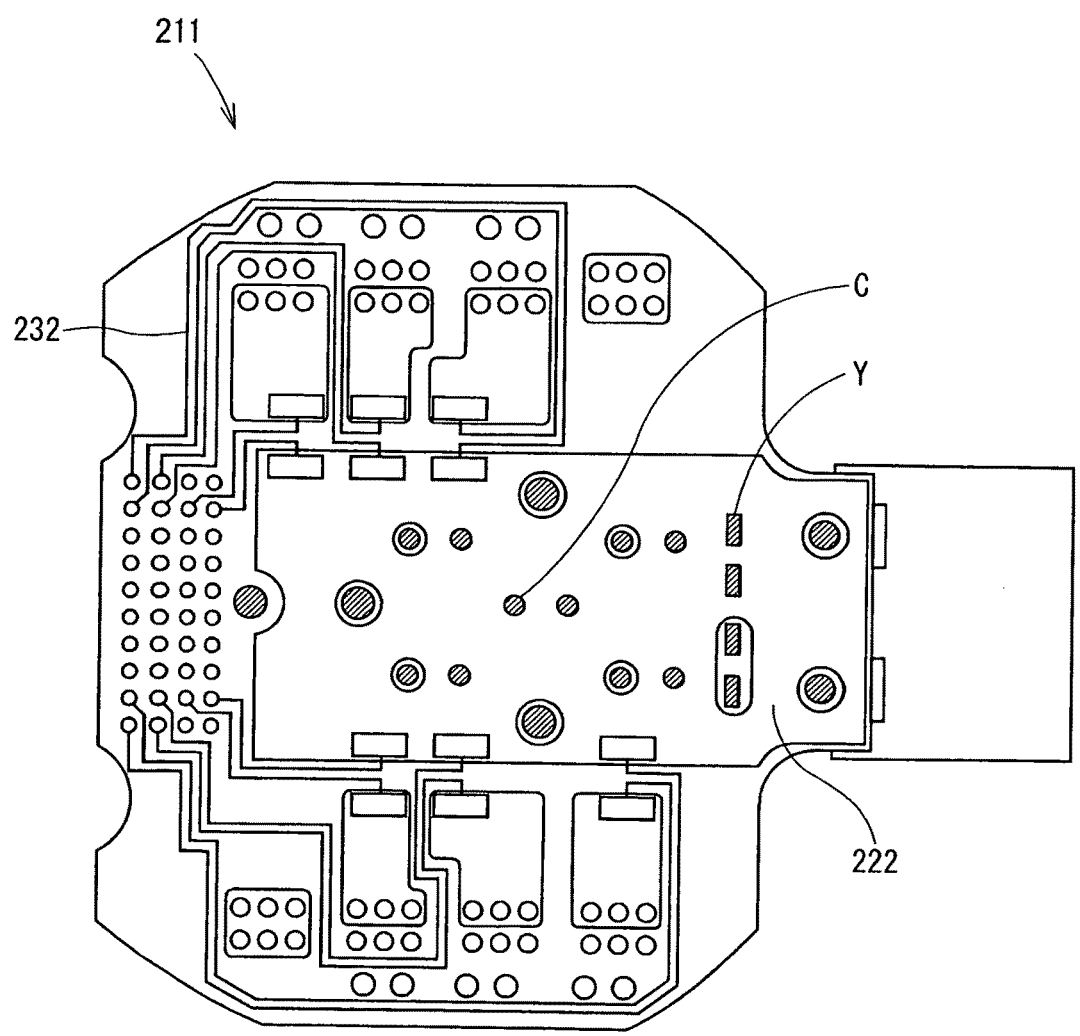
FIG. 26 is a plan view showing a first layer of the power circuit substrate in the second embodiment.
Figure 27:
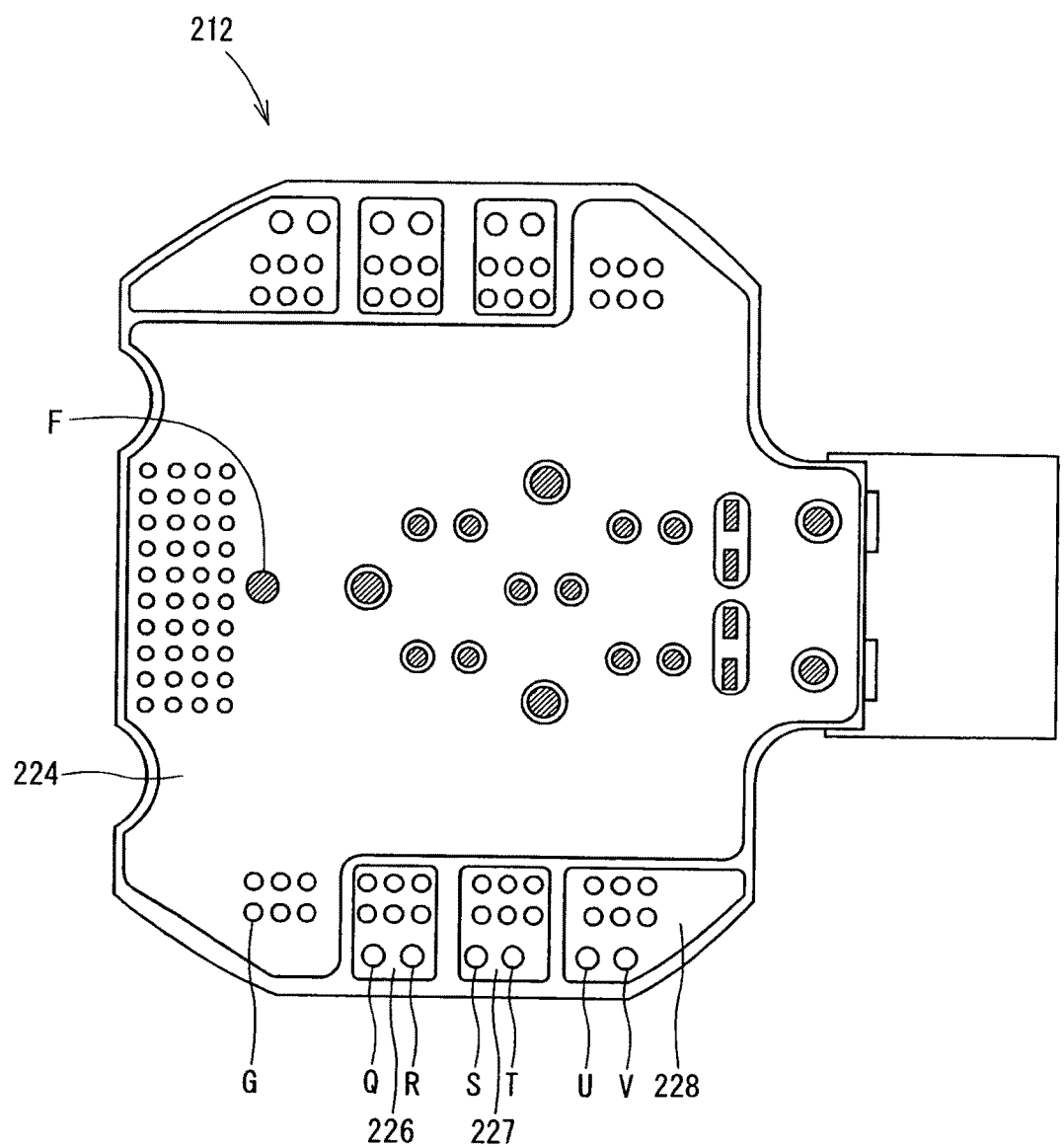
FIG. 27 is a plan view showing a second layer of the power circuit substrate in the second embodiment.
Figure 28:
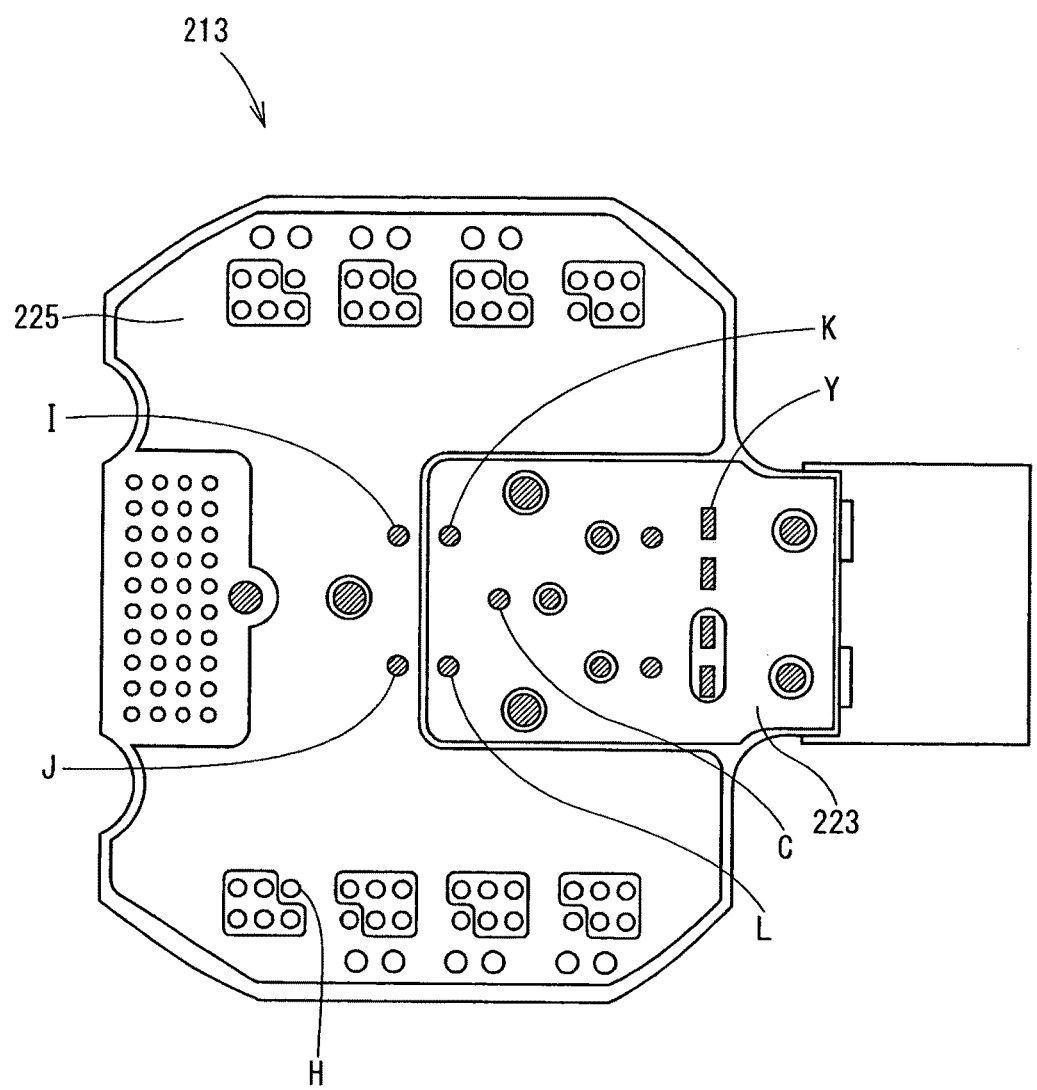
FIG. 28 is a plan view showing a third layer of the power circuit substrate in the second embodiment.
Figure 29:
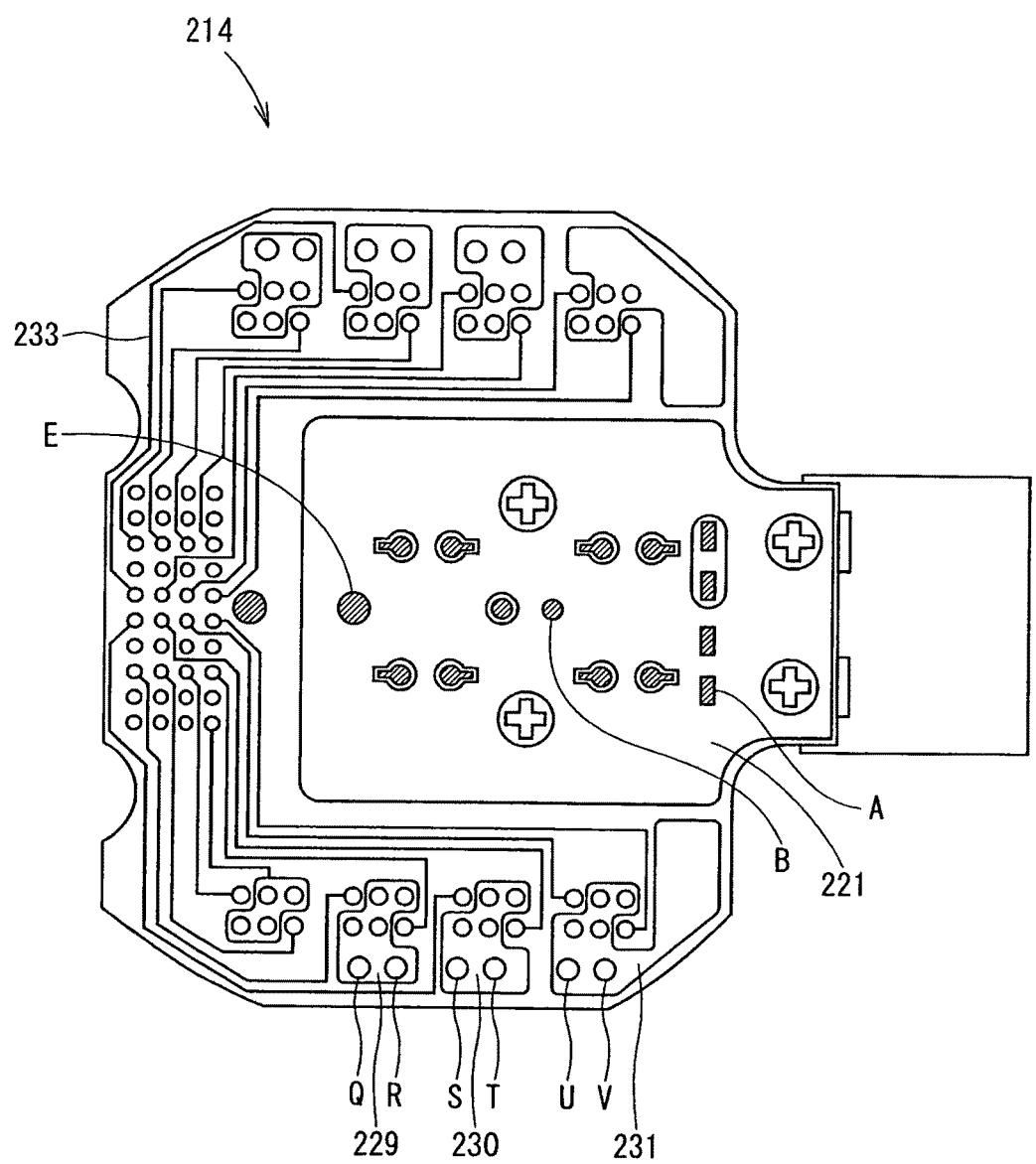
FIG. 29 is a plan view showing a fourth layer of the power circuit substrate in the second embodiment.
Figure 30:
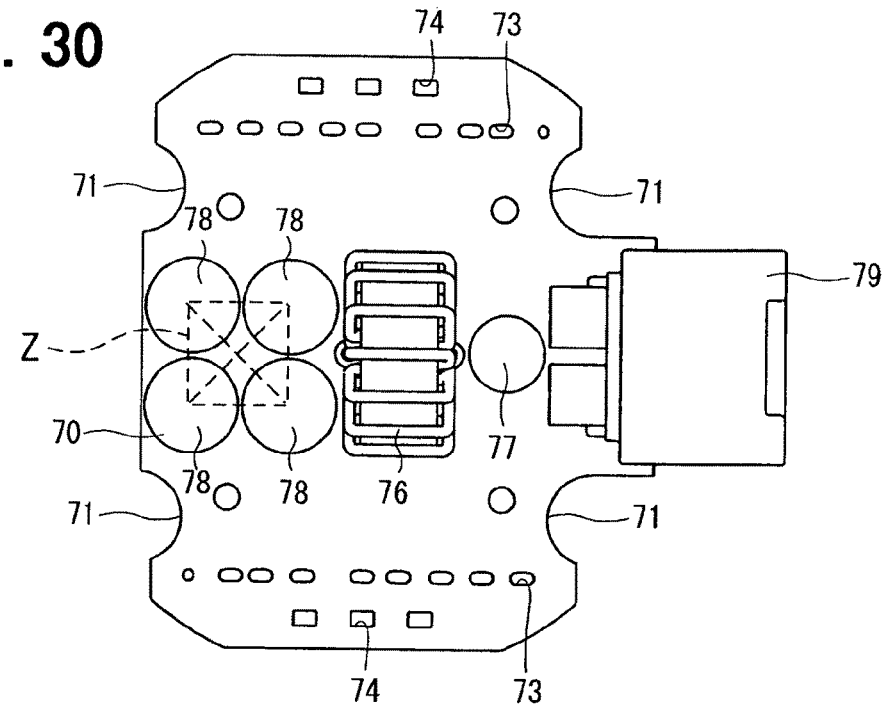
FIG. 30 is a plan view of a control unit in a third embodiment of the present invention, in which a heat sink and a control circuit substrate of the control unit is removed.

Conductor patterns formed in the power circuit substrate 70 is shown in FIGS. 26 to 29. FIG. 26 shows a conductor pattern of a first layer 211. FIG. 27 shows a conductor pattern of a second layer 212. FIG. 28 shows a conductor pattern of a third layer 213. FIG. 29 shows a conductor pattern of a fourth layer 214. Wide conductors 221 to 231 are formed in the first layer 211 to the fourth layer 214.

Flow of current in the conductors 221 to 233 formed in the first layer 211 to the fourth layer 214 are described with reference to FIG. 1 and FIG. 26 to FIG. 29. The current supplied from the power source 75 flows to the conductor 221 from the terminal A of the power circuit connector 79 to the conductor 221 of the fourth layer 214. Noise components are absorbed from the conductor 221 to the conductor 223 of the conductor 222 of the first layer 211 and the conductor 223 of the third layer 213 through the lead wires B and C of the first smoothing capacitor 77, and then absorbed from the conductors 222 and 223 to the ground through the terminal Y of the power circuit connector 79.

The current flows from the conductor 221 of the fourth layer 214 to the conductor 224 of the second layer 212 through the lead wires E and F of the choke coil 76. The current flows from the conductor 224 to the terminal G of the power supply relays 87 and 88. The current flows from the terminal H of the power supply relays 87 and 88 to the conductor 225 of the third layer 213. The current flows from the conductor 225 to the corresponding coils, that is, the U-phase coil, the V-phase coil and the W-phase coil, through the FETs 81 to 83 at the high-potential side, the conductors 226 to 231 of the second layer 212 and the fourth layer 214, and the motor wires Q to V.

The current flows from the U-phase coil, the V-phase coil and the W-phase coil to the conductor 222 of the first layer 211 and the conductor 223 of the third layer 213 through the motor wires Q to V and corresponding FETs 84 to 86 at the low-potential side. The current flows form the conductors 222 and 223 to the ground through the terminal Y of the power circuit connector 79. The second smoothing capacitor 78 connects one lead wire I, J to the conductors 225 of the third layer 212 and the other lead wires K and L to the conductor 223 of the third layer 213 to assist power supply to the FETs 81 to 86. The second smoothing capacitors 78 also absorb ripple currents generated by switching of the FETs 81 to 86.

According to the second embodiment, the control circuit substrate 40 and the power circuit substrate 70 are electrically connected by terminals 278. The semiconductor modules 261 to 264 and 271 to 274 are connected to the control circuit substrate 40 by the conductors 232 and 233, which are formed in the first layer 211 and the third layer 213 of the power circuit substrate 70, respectively. The control signals outputted from the control circuit substrate 40 are transmitted to the semiconductor modules 261 to 264 and 271 to 274 through the terminals 278 shown in FIG. 21 to FIG. 23 and the conductors 232 and 233 of the first layer 211 and the fourth layer 214 of the power circuit substrate 70 so that on/off of the semiconductor modules 261 to 264 and 271 to 274 are controlled. Thus, the motor 2 is controlled and driven in the same manner as in the first embodiment.

According to the second embodiment, the above-described advantages (1) to (5) are provided.

In addition, the semiconductor modules 261 to 264 and 271 to 274, which resin-mold respective FETs therein, are used. The semiconductor modules 261 to 264 and 271 to 274 are arranged on the surface of the heat sink 250, which faces the power circuit substrate 70. Thus, space of the control unit 3 can be effectively used so that the electric drive apparatus can be reduced in size.

Third Embodiment

An electric drive apparatus according a third embodiment of the present invention is shown in FIG. 30 to FIG. 33. This embodiment is a variation of the first embodiment.

According to the third embodiment, the first smoothing capacitor 77 and the second smoothing capacitors 78 and the choke coil 76 are arranged differently from the first embodiment. These large-sized electronic parts are arranged such that the first smoothing capacitor 77, the choke coil 76 and the second smoothing capacitors 78 are arranged in this order on the power circuit substrate 70 from the power circuit connector 79 side. The second smoothing capacitors 78 are arranged such that the imaginary line Z connecting axes of the second smoothing capacitors 78 forms a square shape when viewed in the axial direction from one axial side of the shaft 35.

Figure 31:
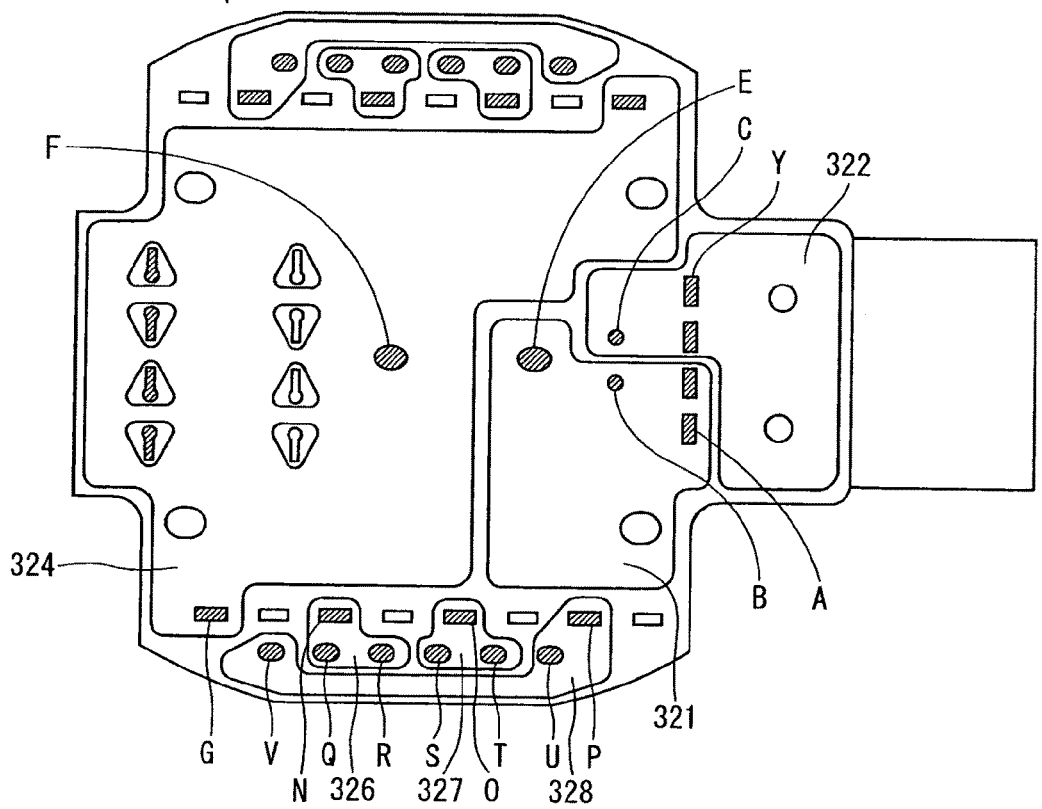
FIG. 31 is a plan view showing a first layer and a fourth layer of a power circuit substrate of the control unit in the third embodiment.
Figure 32:
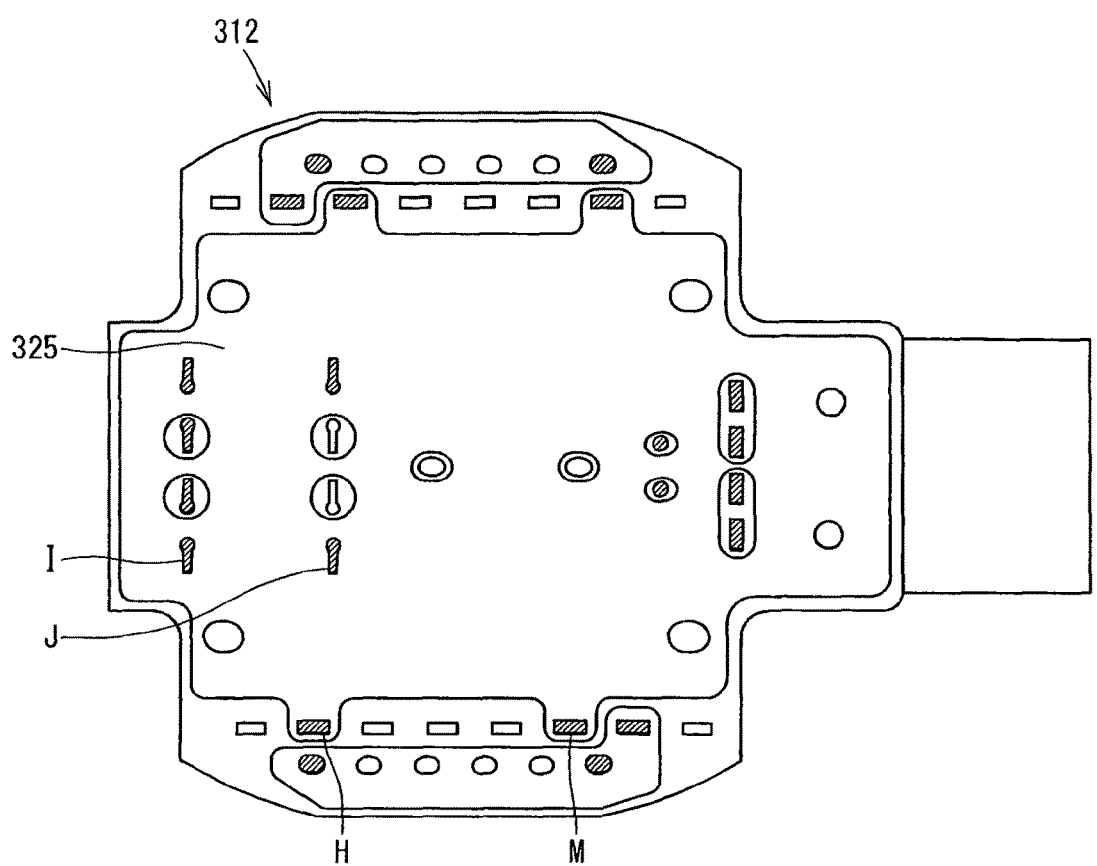
FIG. 32 is a plan view showing a second layer of the power circuit substrate of the control unit in the third embodiment.
Figure 33:
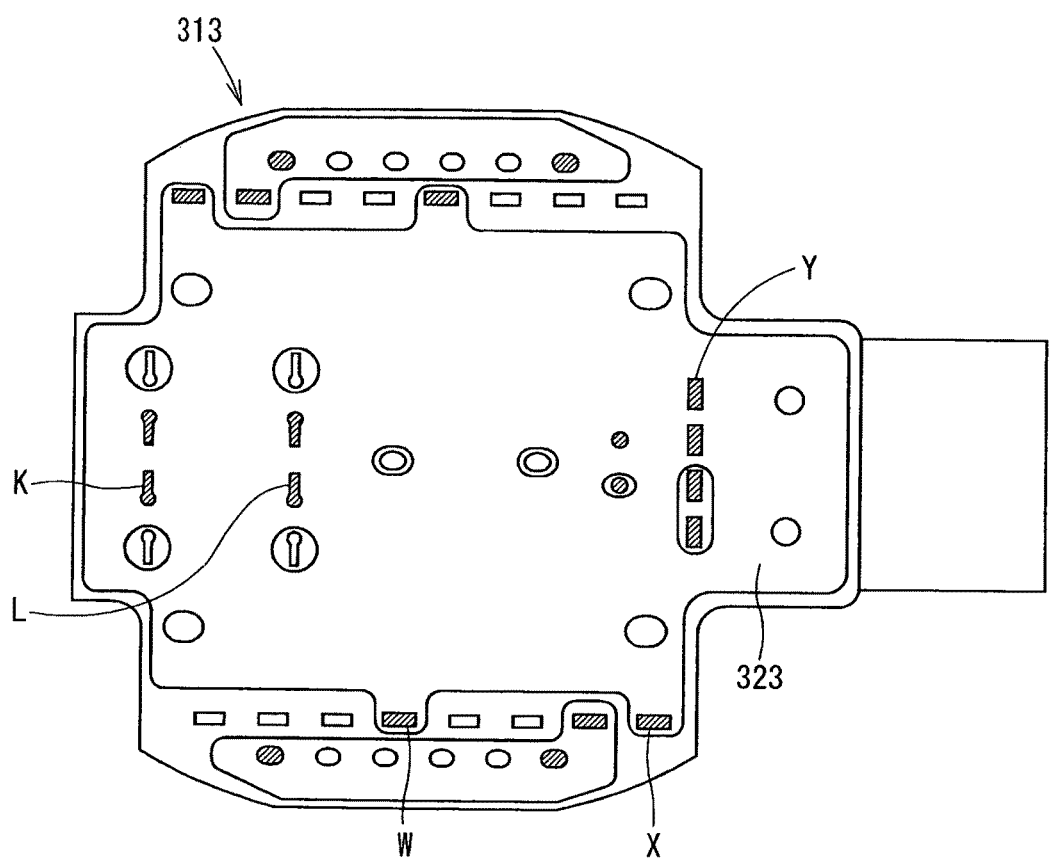
FIG. 33 is a plan view showing a third layer of the power circuit substrate of the control unit in the third embodiment.
Figure 34:
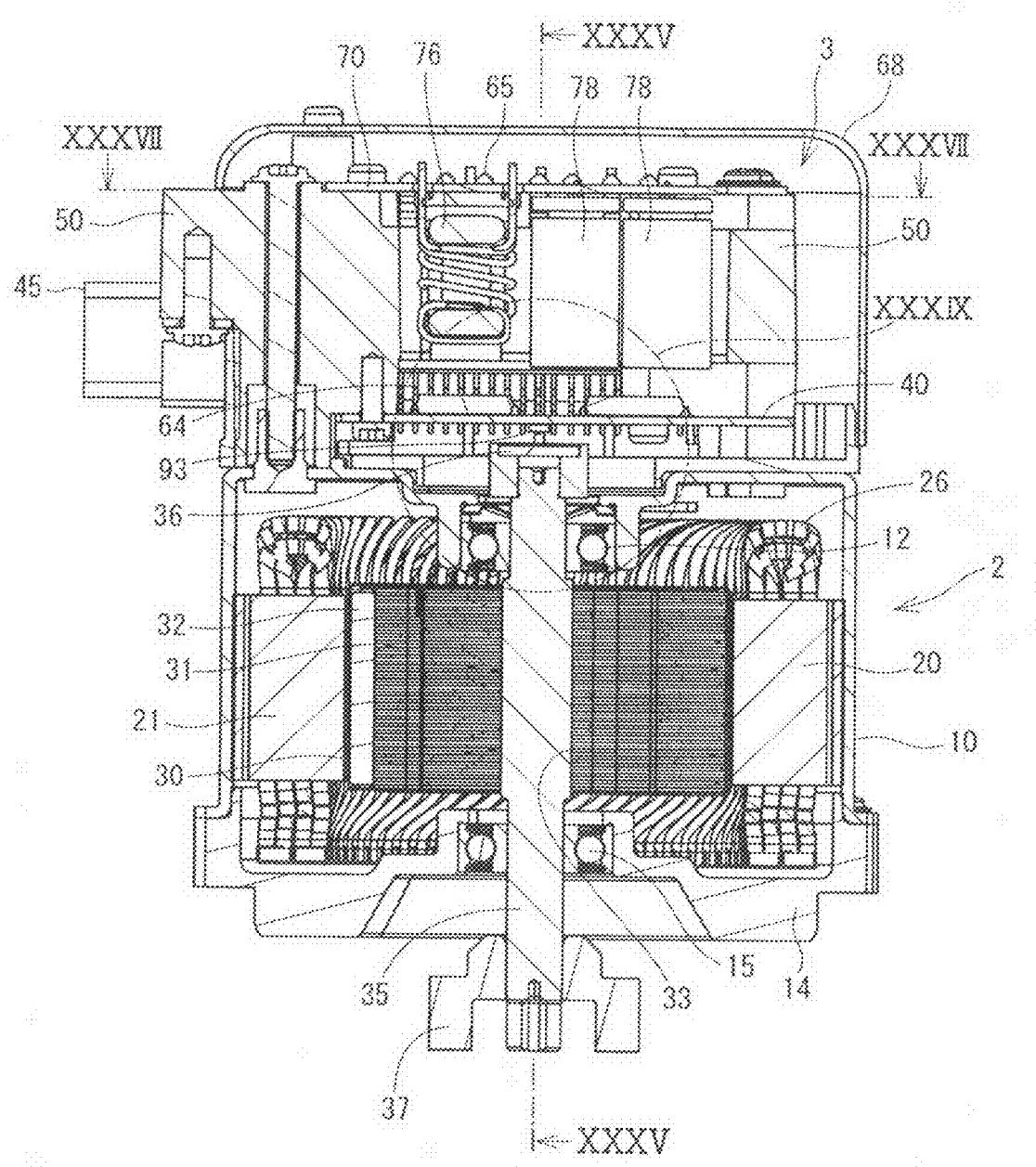
FIG. 34 is a sectional view of an electric drive apparatus according to a fourth embodiment of the present invention.
Figure 35:
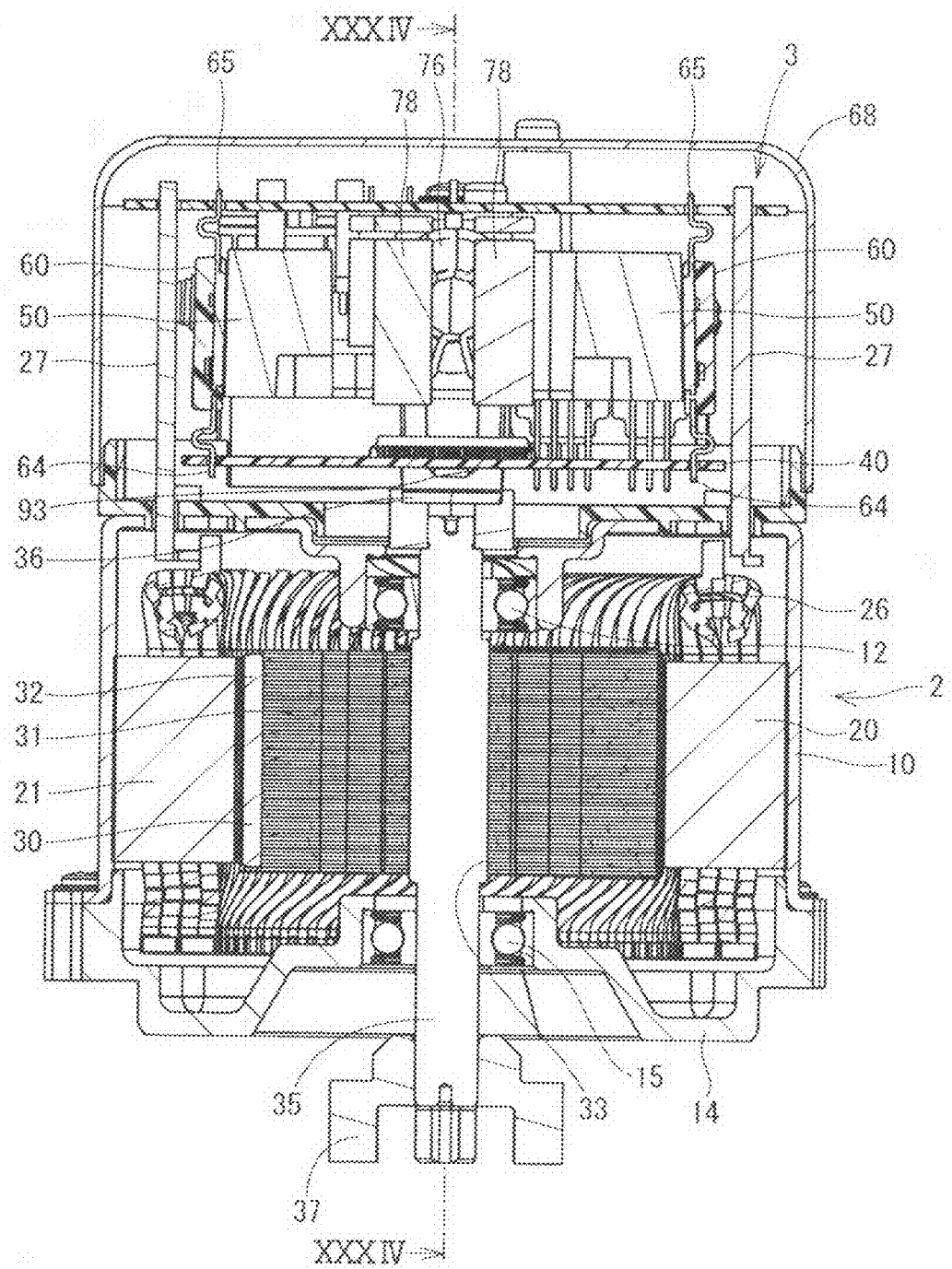
FIG. 35 is a sectional view of the electric drive apparatus taken along a line XXXV-XXXV in FIG. 34.

The conductors formed in the power circuit substrate 70 is shown in FIG. 31 to FIG. 33. FIG. 31 shows conductor patterns of a first layer 311 and a fourth layer 314. FIG. 32 shows a conductor pattern of a second layer 312. FIG. 33 shows a conductor pattern of a third layer 313. Wide conductors 321 to 331 are formed in the first layer 311 to the fourth layer 314.

Flow of current in the conductors 321 to 328 formed in the first layer 311 to the fourth layer 314 are described with reference to FIG. 1 and FIG. 31 to FIG. 34. The current supplied from the power source 75 flows to the conductor 321 of the first layer 311 and the fourth layer 314 from the terminal A of the power circuit connector 79. Noise components flow to the conductor 322 of the first layer 311 and the fourth layer 314 as well as the conductor 323 of the third layer 313 through the lead wires B and C of the first smoothing capacitor 77, and then flow from the conductors 322 and 323 to the ground through the terminal Y of the power circuit connector 79.

The current flows from the conductor 321 of the first layer 311 and the fourth layer 314 to the conductor 324 through the lead wires E and F of the choke coil 76. The current flows from the conductor 324 to the terminal G of the power supply relays 87 and 88. The current flows from the terminal H of the power supply relays 87 and 88 to the conductor 325 of the second layer 312. The current flows from the conductor 325 to the corresponding coils, that is, the U-phase coil, the V-phase coil and the W-phase coil, through the power terminal M, the FETs 81 to 83 at the high-potential side, the power terminals N, O, P, and the conductors 326 to 328 of the first layer to the fourth layer.

The current flows from the U-phase coil, the V-phase coil and the W-phase coil to the conductor 323 of the third layer 313 through the motor wires Q to V, corresponding FETs 84 to 86 at the low-potential side and the power terminals W, X. The current flows form the conductors 322 to the ground through the terminal Y of the power circuit connector 79. The second smoothing capacitor 78 connects one lead wire I, J to the conductor 325 of the second layer 312 and the other lead wires K and L to the conductor 323 of the third layer 313 to assist power supply to the FETs 81 to 86. The second smoothing capacitors 78 also absorb ripple currents generated by switching of the FETs 81 to 86.

According to the third embodiment, the above-described advantages (1) to (5) are provided.

Fourth Embodiment

Figure 36:
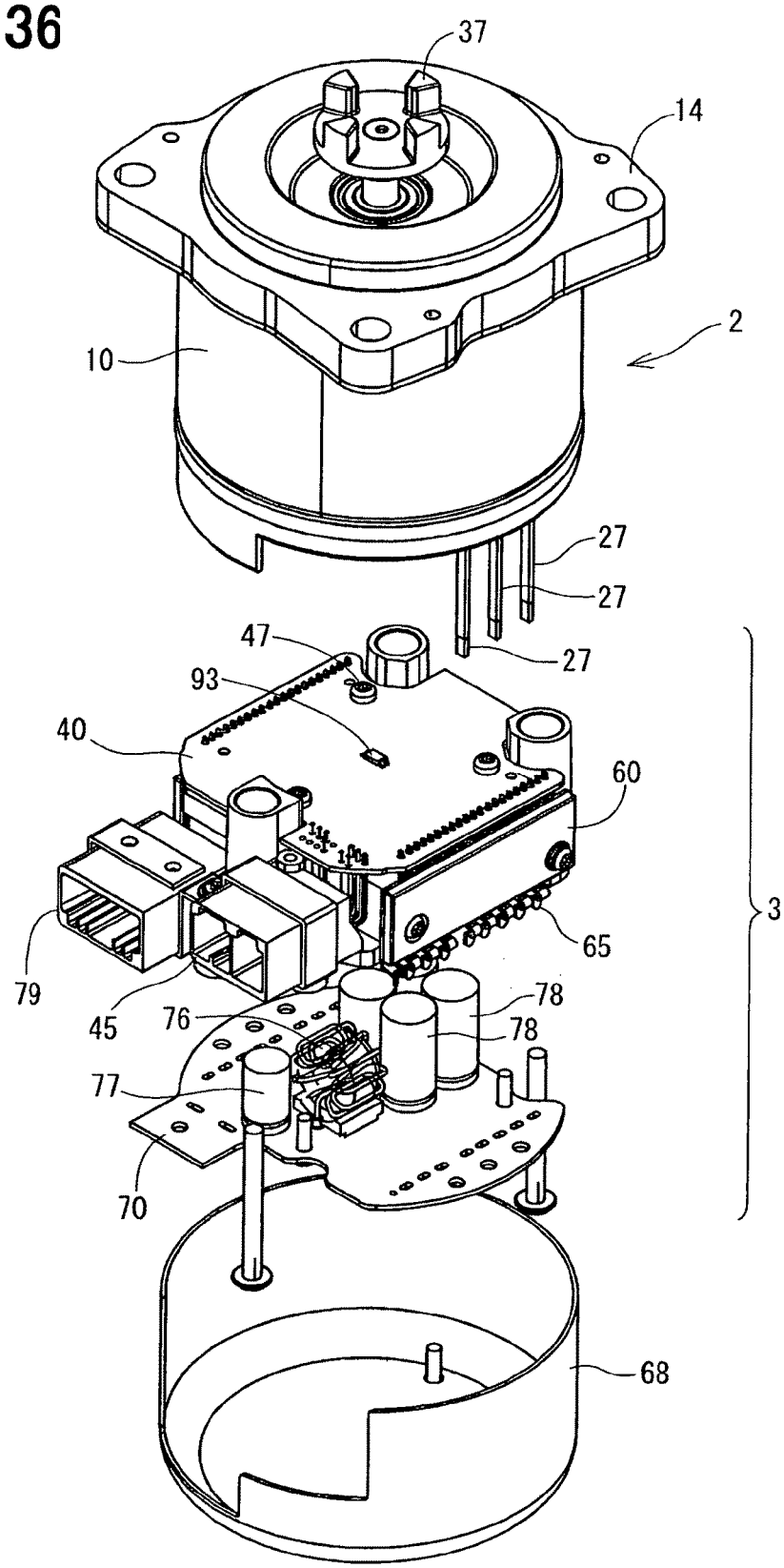
FIG. 36 is an exploded perspective view of an electric drive apparatus according to the fourth embodiment of the present invention.
Figure 37:
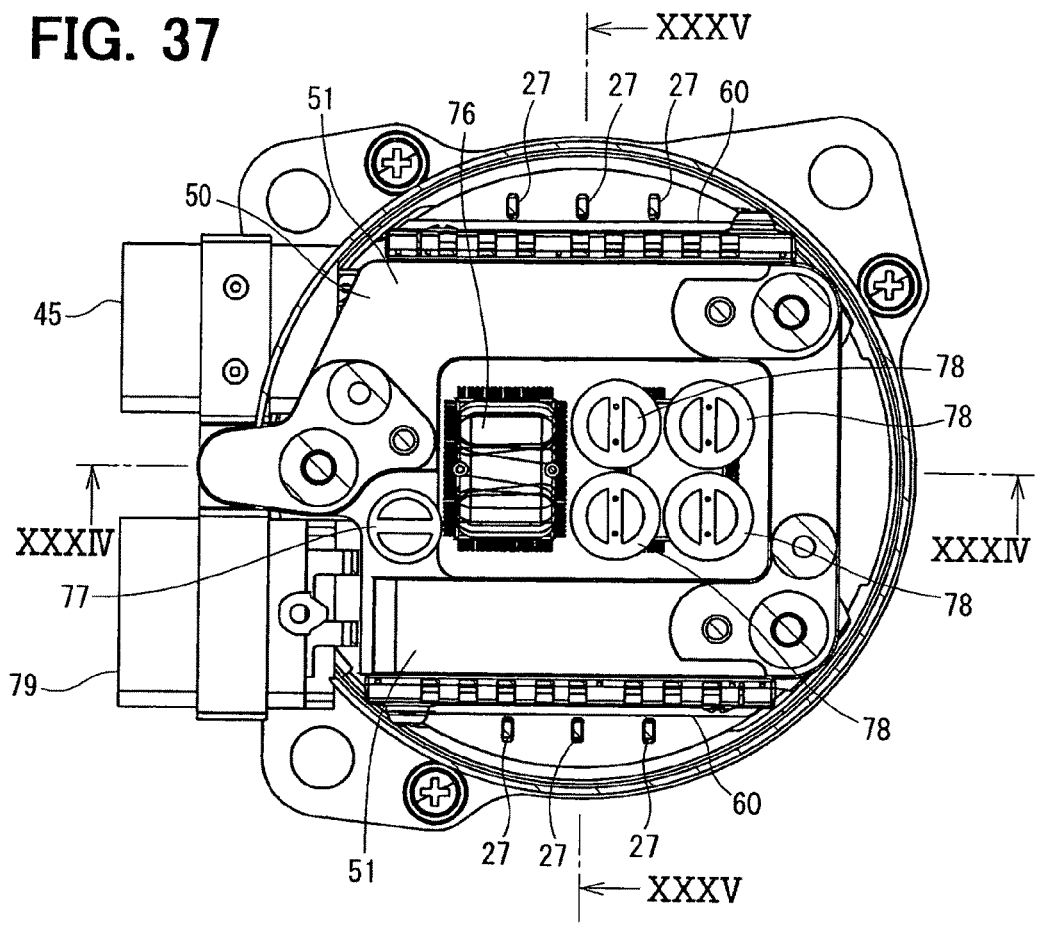
FIG. 37 is a sectional view of the electric drive apparatus taken along a line XXXVII-XXXVII in FIG. 34.
Figure 38:
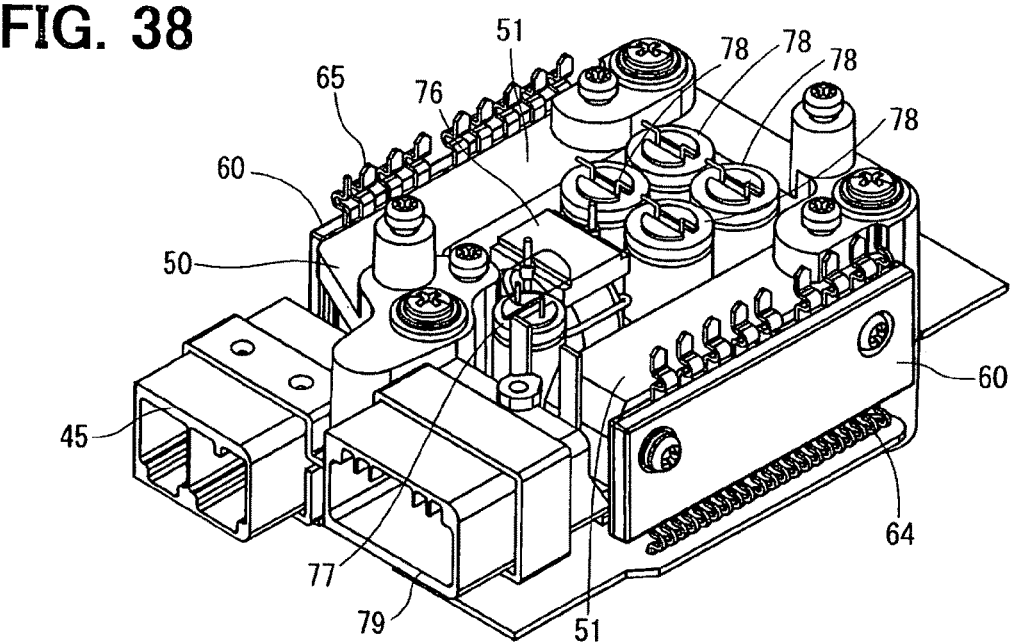
FIG. 38 is a perspective view of the control unit according to the fourth embodiment, in which a power circuit substrate is removed in FIG. 34.

An electric drive apparatus according to a fourth embodiment of the present invention is shown in FIGS. 34 to 39. According to the fourth embodiment, the first smoothing capacitor 77, the choke coil 76 and the second smoothing capacitors 78 are mounted on the power circuit substrate 70 in the named order from the power circuit connector 79 side as shown in FIG. 36 to FIG. 38.

Figure 39:
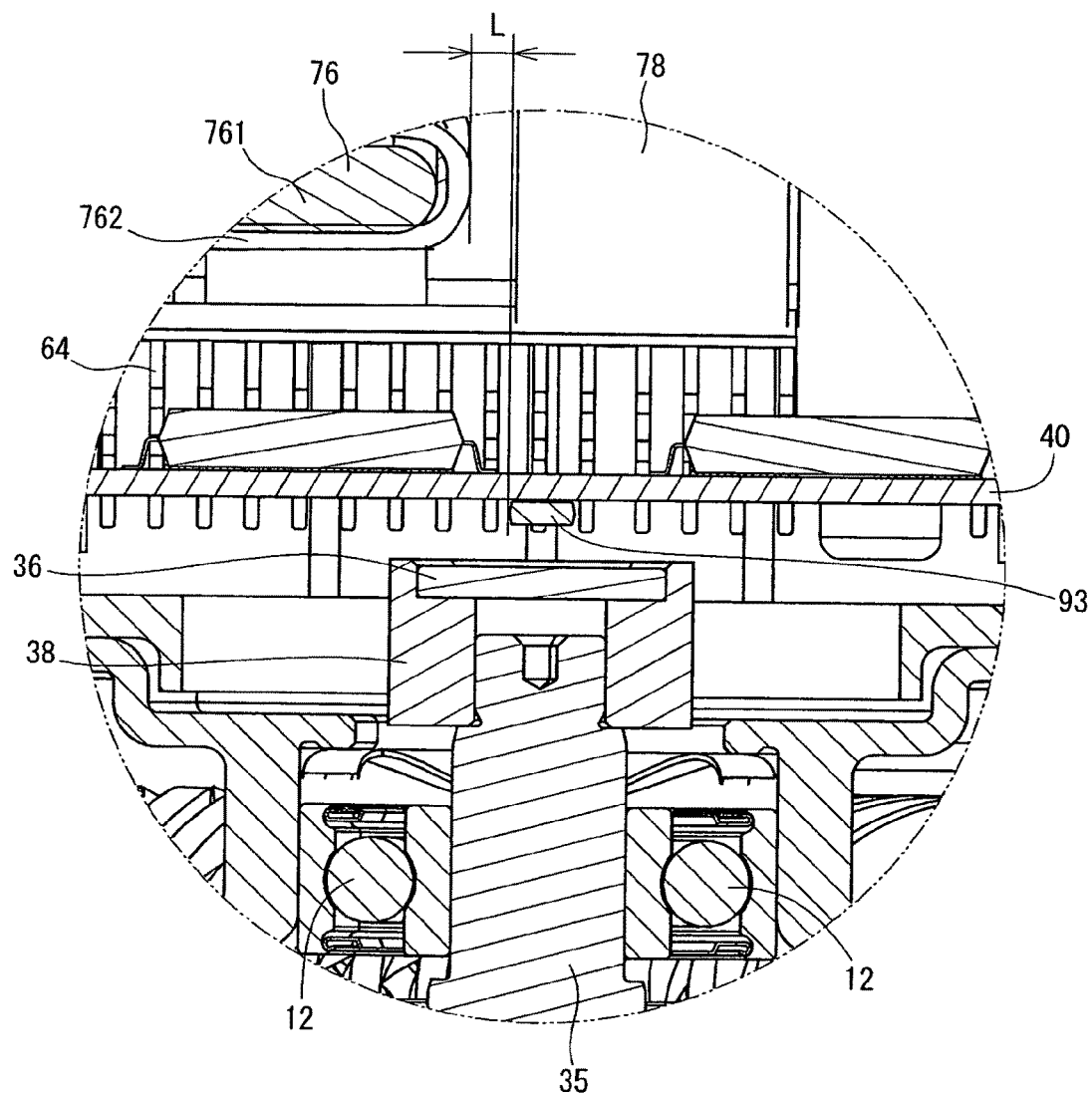
FIG. 39 is a partial enlarged view of a part of the electric drive apparatus according to the fourth embodiment indicated by a circle XXXIX in FIG. 34.

The power circuit connector 79 and the control circuit connector 45 are provided to open in the same direction. A cylindrical attachment 38 is fitted to an axial end part of the shaft 35, which is at the control circuit substrate 40 side, as shown in FIG. 39. The magnet 36 is firmly fixed to the attachment 38. The position sensor 93 is mounted on the control circuit substrate 40 to be on the axis of the shaft 35 and at the side facing the magnet 36. The position sensor 93 may be a magneto-resistive (MR) sensor, which varies its resistance value in accordance with magnetic flux passing through its inside sensing element. The position sensor 93 detects changes in the magnetic flux caused by the magnet 36, which rotates with the shaft 35. Thus, the position of the rotor 30 is detected.

The choke coil 76 has a tubular core 761 and a winding 762 wound about the tubular core 761. The axis of the core 761 and the axis of the shaft 35 are generally perpendicular to each other. The core 761 of the choke coil 76 is formed to have a cross section, which is transverse to the axis of the core 761, in a rectangular shape. The position sensor 93 is arranged to be spaced from the axial end of the choke coil 76 by have a distance L as shown in FIG. 39. This distance L is set such that the position sensor 93 can detect accurately the changes in magnetic field generated by the magnet 36 without being influenced by leakage flux of the choke coil 76.

The position sensor 93 and the choke coil 76 are spaced apart in the radial direction when projected onto an imaginary plane, which is perpendicular to the axis of the shaft 35. When current flows in the winding 762 of the choke coil 76, magnetic field or magnetic flux is generated in a manner to circulate the outside of the winding 762. That is, the magnetic field of the choke coil 76 is generated in a direction perpendicular to a direction, in which the winding 762 extends. Therefore, leakage flux of the choke coil 76 increases in the radial direction and the axial direction of the core 761. By arranging the position sensor 93 not to overlap the choke coil 76 in the radial direction of the choke coil 76, the influence of the leakage flux of the choke coil 76 is reduced. Thus, the position sensor 93 is enabled to detect the magnetic flux of the magnet 93, so that the position of the rotor 30 can be detected accurately.

The fourth embodiment also provides the same advantages (1) to (5) described above. Since cross talk of the power circuit substrate 70 is reduced, noises of the power source can be suppressed.

Other Embodiment

According to the above-described embodiments, the control unit 3 is provided at a side opposite to the gear box of the motor 2. However, the control unit 3 may be provided between the motor 2 and the gear box. In this case, the shaft 35 of the motor 2 extends toward the gear box side by passing a space formed between opposing heat radiation blocks 51, the control circuit substrate 40 and the power circuit substrate 70.

According to the above-described embodiments, the motor 2 is associated with two systems of inverters 80 and 89. It is also possible to associate the motor 2 with one system or three systems of inverters.

According the above-described embodiments, the first smoothing capacitor 77, the second smoothing capacitors 78, the choke coil 76 and the power modules 60 are connected electrically by the conductors of the power circuit substrate 70. However, such large-sized electronic parts and power modules may be connected by bus bars or the like, for example.

According to the above-described embodiments, a plurality of FETs 81 to 88 is resin-molded in the power module 60. However, only a part of the FETs 81 to 88 may be resin-molded. The power module 60 may be two or more.

According to the above-described embodiments, FETs 81 to 88 are used as switching elements. However, any kinds of switching elements may be used as far as such elements have the current supply switching function.

According to the above-described embodiments, the first smoothing capacitor 77, the second smoothing capacitors 77 and the choke coil 76 are exemplified as parts, which are inserted and mounted. These electronic parts may however be used as surface-mounted parts.

According to the above-described embodiments, the first smoothing capacitor 77, the second smoothing capacitors 78 are exemplified as aluminum electrolytic capacitors. The capacitors 77 and 78 may however be other capacitors such as film capacitors. The terminals of the capacitors and the power modules may be connected directly.

According to the above-described embodiments, the heat sink 50, 250 is formed as a single body, in which two heat radiation blocks 51, 251 are coupled by an intermediate part 52, 252. The heat radiation blocks may be formed as separate parts, which are not coupled to each other in a single body.

According to the above-described embodiments, all of the first smoothing capacitor 77, the second smoothing capacitors 78 and the choke coil 76 are provided between the power modules 60. However, only a part of the first smoothing capacitor 77, the second smoothing capacitors 78 and the choke coil 76 may be provided between the power modules 60.

According to the above-described embodiments, the electric drive apparatus 1 is used in the EPS. The electric drive apparatus 1 may be applied to other technical fields.

Thus, the present invention is not limited to the above-described embodiments but may be implemented in other various embodiments.

What is claimed is:

1. An electric drive apparatus comprising:
    a motor having a motor case formed in a cylindrical shape, a stator located radially inside the motor case and coils wound to provide a plurality of phases, a rotor located radially inside the stator and rotatable relative to the stator, and a shaft rotatable together with the rotor;
    a plurality of power modules located to sandwich a plane including a rotation axis of the shaft therebetween at one axial end side of the shaft, each of the power modules including switching elements for switching over a current supplied to the coils, a mold part for molding the switching elements therein and terminals protruding from the mold part,
    a first smoothing capacitor, electrically connected to a power circuit connector side to supply current to the switching elements from a power source, for reducing power source noise;
    a choke coil, electrically connected in series between the power source and the switching elements, for attenuating variation in power supplied to the switching elements; and
    a second smoothing capacitor, electrically connected to the switching elements in parallel, for absorbing ripple current generated when current supply to the switching elements is switched over,
    wherein at least one of the first smoothing capacitor, the second smoothing capacitor and the choke coil is located between the power modules.

2. The electric drive apparatus according to claim 1, wherein:
    the second smoothing capacitor includes an even number of smoothing capacitors formed in a cylindrical shape, the smoothing capacitors being arranged such that axes of the smoothing capacitors are generally in parallel with an axis of the shaft and an imaginary line formed by connecting the axes of four smoothing capacitors generally form a rectangle when viewed in an axial direction of the shaft.

3. The electric drive apparatus according to claim 2, wherein:
    the first smoothing capacitor is formed in generally a cylindrical shape, arranged such that an axis of the first smoothing capacitor is generally in parallel with the axis of the shaft and located on a diagonal line of the rectangle formed by the imaginary line connecting the four smoothing capacitors when viewed in the axial direction of the shaft.

4. The electric drive apparatus according to claim 1, wherein:
    the choke coil is formed in generally a tubular shape and arranged such that an axis of the choke coil is perpendicular to the axis of the shaft.

5. The electric drive apparatus according to claim 1, wherein:
    a distance between the smoothing capacitors, which are located at sides of one and other of the power modules, is shorter than a distance between two of the smoothing capacitors, which are located at a side of either one of the one and the other of the power modules.

6. The electric drive apparatus according to claim 1, further comprising:
    a heat sink extending generally in parallel with a long side of the imaginary line forming the rectangle when viewed in the axial direction of the shaft, and located in a space between the power module and the first smoothing capacitor, the second smoothing capacitor and the choke coil.

7. The electric drive apparatus according to claim 1, wherein:
    a conductor of the power source side for supplying current to the switching elements is a conductor of a printed-circuit board, which is provided at one axial side of the first smoothing capacitor and mounts thereon the first capacitor, the choke coil and the second capacitor.

8. The electric drive apparatus according to claim 7, further comprising:
    a control circuit substrate located at other axial end side of the first smoothing capacitor and having a microcomputer, which controls switching of the current by the switching elements.

9. The electric drive apparatus according to claim 1, wherein:
    the first capacitor, the choke coil and the second capacitor are located on a printed circuit board in a named order from the power circuit connector side.

10. The electric drive apparatus according to claim 9, further comprising:
    a magnet attached to an end of the shaft to face the control circuit substrate; and
    a position sensor provided to face the magnet to detect changes in magnetic flux of the magnet,
    wherein the magnet and the position sensor are spaced apart in a radial direction of the shaft so that the magnet and the position sensor do not overlap when projected on an imaginary plane, which is perpendicular to the axis of the shaft.

11. The electric drive apparatus according to claim 10, wherein:
    the choke coil has a tubular core and a winding wound about the tubular core;
    an axis of the core and the axis of the shaft are generally perpendicular to each other; and
    the tubular core has generally a rectangular shape in cross section, a plane of which is perpendicular to the axis of the shaft.

12. The electric drive apparatus according to claim 1, wherein:
    all of the first smoothing capacitor, the choke coil and the second smoothing capacitor are sandwiched between the power modules.

13. The electric drive apparatus according to claim 2, wherein:
    the choke coil is formed in generally a tubular shape and arranged such that an axis of the choke coil is perpendicular to the axis of the shaft.

14. The electric drive apparatus according to claim 2, wherein:
    a distance between the smoothing capacitors, which are located at sides of one and other of the power modules, is shorter than a distance between two of the smoothing capacitors, which are located at a side of either one of the one and the other of the power modules.

15. The electric drive apparatus according to claim 2, further comprising:
a heat sink extending generally in parallel with a long side of the imaginary line forming the rectangle when viewed in the axial direction of the shaft, and located in a space between the power module and the first smoothing capacitor, the second smoothing capacitor and the choke coil.

16. The electric drive apparatus according to claim 2, wherein:
a conductor of the power source side for supplying current to the switching elements is a conductor of a printed-circuit board, which is provided at one axial side of the first smoothing capacitor and mounts thereon the first capacitor, the choke coil and the second capacitor.

* * * * *